United States Patent
Saylor

(10) Patent No.: US 8,983,440 B1
(45) Date of Patent: Mar. 17, 2015

(54) CALL HANDLING USING SOCIAL NETWORK DATA

(71) Applicant: MicroStrategy Incorporated, Vienna, VA (US)

(72) Inventor: Michael J. Saylor, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 35 days.

(21) Appl. No.: 13/735,107

(22) Filed: Jan. 7, 2013

Related U.S. Application Data

(60) Provisional application No. 61/668,651, filed on Jul. 6, 2012.

(51) Int. Cl.
- *H04M 3/42* (2006.01)
- *H04M 3/436* (2006.01)
- *H04W 4/16* (2009.01)

(52) U.S. Cl.
CPC ..................................... *H04W 4/16* (2013.01)
USPC ........................................... 455/415; 705/319

(58) Field of Classification Search
CPC ......... H04W 8/18; H04W 4/02; H04W 4/023; H04W 4/16
USPC ....................... 455/414.1, 415, 417
See application file for complete search history.

(56) References Cited

U.S. PATENT DOCUMENTS

| | | | |
|---|---|---|---|
| 5,724,416 A | 3/1998 | Foladare et al. | |
| 6,216,011 B1 | 4/2001 | Wierzbicki et al. | |
| 6,311,078 B1 | 10/2001 | Hardouin | |
| 6,408,177 B1 | 6/2002 | Parikh et al. | |
| 6,577,859 B1 | 6/2003 | Zahavi et al. | |
| 6,580,907 B2 * | 6/2003 | Hughes et al. | 455/433 |
| 6,597,667 B1 | 7/2003 | Cerna | |
| 6,842,622 B2 | 1/2005 | Peters et al. | |
| 6,941,131 B2 | 9/2005 | Roderique | |
| 7,010,288 B2 | 3/2006 | Brown et al. | |
| 7,069,027 B2 | 6/2006 | Miriyala | |
| 7,231,208 B2 | 6/2007 | Robertson et al. | |
| 7,245,941 B2 | 7/2007 | Scott | |
| 2005/0282590 A1 | 12/2005 | Haparnas | |
| 2006/0160562 A1 | 7/2006 | Davis et al. | |
| 2007/0072619 A1 | 3/2007 | Wei et al. | |
| 2007/0263798 A1 | 11/2007 | Dewing et al. | |
| 2007/0293159 A1 | 12/2007 | Etelapera | |
| 2008/0152097 A1 | 6/2008 | Kent | |

(Continued)

OTHER PUBLICATIONS

'Wikipedia' [online]. "Caller ID," [retrieved Jul. 4, 2012]. Retrieved from the Internet: <http://en.wikipedia.org/wiki/Caller_ID, 15 pages.

(Continued)

*Primary Examiner* — San Htun
*Assistant Examiner* — Erica Navar
(74) *Attorney, Agent, or Firm* — Fish & Richardson P.C.

(57) ABSTRACT

Call handling options are selected for calls using social network data that is descriptive of the relationship of a caller to a call recipient in a social networking platform. An identifier for a calling device is used to access social network data that is descriptive of a relationship of the caller to the call recipient in the social networking platform. A call handling option for a call is selected, from among multiple, different call handling options, based on the social network data that is descriptive of the relationship of the caller to the call recipient in the social networking platform.

19 Claims, 11 Drawing Sheets

(56) References Cited

U.S. PATENT DOCUMENTS

| | | | |
|---|---|---|---|
| 2009/0310768 A1* | 12/2009 | Hansen et al. | 379/201.02 |
| 2010/0119051 A1 | 5/2010 | Belz et al. | |
| 2011/0274260 A1 | 11/2011 | Vaananen | |
| 2011/0294478 A1* | 12/2011 | Trivi et al. | 455/415 |
| 2012/0196581 A1 | 8/2012 | Papakipos et al. | |
| 2013/0051542 A1 | 2/2013 | Yao et al. | |

OTHER PUBLICATIONS

'Mac Help from Macivrese' [online]. "Sync Your Facebook Friends with iPhone Contacts," found on 'Wayback Machine'. Retrieved on Sep. 5, 2012. Retrieved from the Internet: http://web.archive.org/web/20100124103402/http://www.maciverse.com/sync-your-facebook-friends-with-iphone-contacts, 5 pages.

U.S. Non-Final Office Action for U.S. Appl. No. 13/735,074 dated May 20, 2014, 10 pages.

U.S. Non-Final Office Action for U.S. Appl. No. 13/735,089 dated Apr. 23, 2014, 23 pages.

U.S. Final Office Action for U.S. Appl. No. 13/735,089 dated Sep. 16, 2014, 23 pages.

U.S. Notice of Allowance for U.S. Appl. No. 13/735,074 dated Sep. 19, 2014, 7 pages.

* cited by examiner

600

| | Relationship | Day | Time | Action |
|---|---|---|---|---|
| 601a → | Friends 602a | everyday 604a | 8am - 8pm 606a | ring (otherwise, direct to voicemail) 608a |
| 601b → | Friends of Friends 602b | weekends 604b | anytime 606b | direct to voicemail 608b |
| 601c → | Family 602c | everyday 604c | anytime 606c | ring 608c |
| 601d → | Poker Players (subset of Friends) 602d | Fri - Sun 604d | 8am - 11:30pm 606d | ring 608d |
| 601e → | Unknown Callers 602e | weekends 604e | anytime 606e | direct to voicemail 608e |
| 601f → | Alumni Group 602f | weekdays 604f | 10am - 6pm 606f | ring (otherwise, direct to voicemail) 608f |
| 601g → | Co-workers 602g | weekdays 604g | 7am - 7pm 606g | ring (otherwise, forward to office) 608g |
| 601h → | Professional Organization 602h | weekdays 604h | 10am - 6pm 606h | ring (otherwise, direct to voicemail) 608h |
| 601i → | Facebook Friends 602i | everyday 604i | 8am - 10pm 606i | ring (otherwise, direct to voicemail) 608i |
| | . . . | . . . | . . . | . . . |

FIG. 6

CALL HANDLING USING SOCIAL NETWORK DATA

CROSS-REFERENCE TO RELATED APPLICATION

This application claims the benefit of U.S. Patent Application Ser. No. 61/668,651, filed on Jul. 6, 2012, which is incorporated herein by reference in its entirety.

TECHNICAL FIELD

This disclosure relates to telecommunications, including handling calls using social network data.

BACKGROUND

Phones typically alert the user of the phone when an incoming call is received. Ringtones, vibrations, or other alerts can be produced to inform the user that an incoming call has been received. However, when calls are received at inconvenient times, these alerts can be a nuisance. Unsolicited calls from marketers and others can be distracting and annoying. Typically, a user may turn off a phone or silence the phone's alerts. But after doing so, the user may miss important calls received while the phone is silenced or turned off.

SUMMARY

This disclosure relates to telecommunications, including handling calls using social network data.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 6 and 9 are tables illustrating examples of call handling rules.

DETAILED DESCRIPTION

Figure 1A:
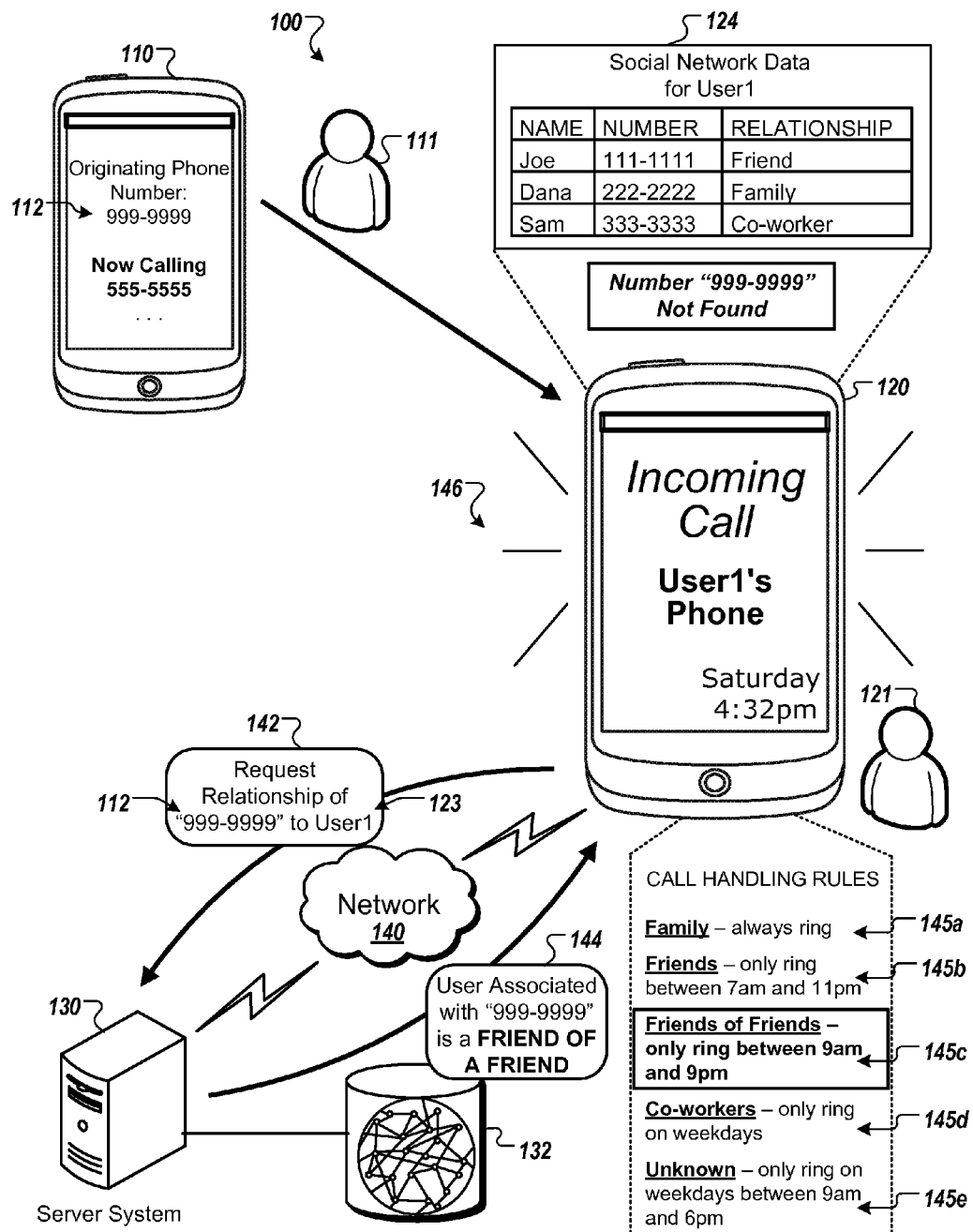
FIGS. 1A, 1B, and 1C are schematic diagrams illustrating an example of a system that can handle calls using social network data.

Techniques are described for using social network data to select and perform call handling actions for received communications (e.g., calls, electronic mail messages, text messages, etc.). In some implementations, a phone or other electronic device receives a call and accesses information about connections in a social networking platform between a caller and a recipient of the call. In these implementations, the electronic device uses the information about the connections to automatically determine whether, for example, to produce an alert and allow the call to be answered, to direct the call to voicemail, or to block the call. The electronic device selects the call handling option for a particular call from among multiple call handling options that are each associated with a different type of social networking relationship.

In some implementations, electronic devices select or modify call handling options based on one or more factors that reflect the likely importance of calls to the recipient. Examples of factors that may indicate the importance of a call include the relationship of the caller to the call recipient in the social networking platform, the geographic proximity of the caller to the recipient, and significant life events recently experienced by the caller. The presence of any of these factors, and others, can be determined using social network data. The social network data may be stored on an electronic device prior to receiving a call, or may be received by the electronic device after receiving the call, for example, over a network.

Automatic call handling based on social networking connections may allow call recipients to receive calls that are likely to be important, while reducing the disturbance of unwanted calls. As an example, a user may receive a phone call at 2:00 am. If the caller is unknown to the user (such as when the caller simply dials an incorrect phone number), the user may be annoyed to be woken up in the night. By contrast, the recipient may desire to answer the call if the caller is a family member of the user, since the family member may have an urgent reason for calling. To avoid unnecessary disturbance, a user may designate that his phone should block calls received after midnight when the caller is not connected to the user in a social network. The user also may designate that his phone should allow all calls from callers designated as family members in a social network, regardless of the time. Thus, after midnight, the caller's phone rings when a family member calls, but not when an unknown caller calls.

In some implementations, when an electronic device receives a call, the electronic device obtains an identifier for a calling device from which the call originated. The electronic device uses the identifier to access social network data that is descriptive of a relationship of the caller to the call recipient in a social network. The electronic device selects, from among multiple, different call handling options, a call handling option for the call based on the social network data, and uses the selected call handling option to perform a call handling action for the call.

As an example, when a user receives a call from a caller designated as a friend in the social networking platform, the user's electronic device may allow the phone to produce an audible alert. When the user receives a call from a caller who is designated as a family member of the user in the social networking platform, the user's electronic device performs a second, different call handling action, such as forwarding the call to another device. When the user receives a call from an unknown caller that has no relationship (or only a remote relationship) to the user in the social networking platform, the user's electronic device performs a third, different call handling action, such as sending the call straight to voicemail without providing any audible alert. In a similar manner, the electronic device may perform different call handling actions for calls from callers who are, for example, friends of the user's friends, co-workers, or members of a group defined in the social networking platform.

In some implementations, the automatic call handling is performed based on multiple factors. An electronic device can select a call handling option based on both (i) a relationship of a caller to a recipient in the social networking platform and (ii) the geographic proximity of the caller to the recipient, where both the relationship and the proximity are determined using social network data. As an example, the electronic device selects a call handling option based on the relationship between the caller and the recipient. The electronic device modifies the call handling option when social network data indicates that the caller is located within a particular distance of the recipient. For instance, when the call handling option designates that the electronic device should send the call to voicemail, the electronic device may instead allow the phone to ring due to the geographic proximity of the caller.

FIG. 1A illustrates an example of a system 100 that handles calls using social network data. The system 100 includes two electronic devices 110, 120, a server system 130, and a network 140. Examples of electronic devices 110, 120 include cellular phones, smartphones, wired phones, personal digital assistants (PDAs), desktop computers, laptop computers, tablet computers, wearable computers, and navigation systems. The electronic devices 110, 120 may be any type of electronic device capable of receiving a call or other communication. The operations described below as being performed by the electronic device 120 may be performed by an application that runs on the electronic device 120, such as a mobile device application.

The electronic device 110, such as a phone, is a calling device associated with a caller 111. The electronic device 120, such as a phone, is associated with a recipient 121. Using the electronic device 110, the caller 111 initiates a communication to the recipient 121, which is received by the electronic device 120. In response to the communication, the manner in which the electronic device 120 responds is based on the relationship of the caller 111 to the recipient 121 in a social networking platform. As described further below, the server system 130 provides social network data (e.g., data about user identities and relationships in a social network) over the network 140. The electronic device 120 uses data from the server system 130 to determine a relationship between the caller 111 and the recipient 121, and thus select an appropriate response to the received communication.

In general, call handling typically involves performing one or more actions with respect to a call or other communication. Some call handling actions affect the status of the call (e.g., answering, forwarding, or terminating the call). Other call handling actions may involve a response that does not necessarily change the status of the call (e.g., playing or suppressing an alert, or sending a notification to another device). Call handling actions may be performed, for example, in response to receipt of the call, while the call is active, after the call has terminated, or any combination thereof. As described further below, call handling rules can designate one or more call handling actions that are performed for calls that satisfy one or more conditions. One of the conditions of a call handling rule can be that the caller must have a particular relationship to the call recipient in a social network. Whether the identity of the caller or other circumstances of the call satisfy the conditions can be determined using social network data, as described further below.

In further detail, in the illustrated example, the electronic device 110 is a phone, and the electronic device 110 initiates a phone call. As an alternative, the call can be a voice call (e.g., whether connected over a telephone network or another network), a video call, a chat message, a short message service (SMS) text message, or a communication of another type.

The incoming call is received at the electronic device 120, which is associated with the call recipient 121. The electronic device 120 obtains an identifier 112 for the electronic device 110 that initiated the call. In the illustrated example, the identifier 112 is a phone number assigned to the electronic device 110. The phone number for the caller can be obtained from, for example, automatic number identification (ANI) data or calling number identification (CNID) data provided in association with the incoming call. Different identifiers can additionally or alternatively be obtained. For example, the identifier 112 can be an identifier for the caller, such as a user name or an electronic address (e.g., an e-mail address, Twitter feed address, etc.).

In some implementations, the identifier 112 used to identify the social networking user identity of the caller 111 is caller identification data (e.g., caller identification data provided with the call). For instance, caller identification data may indicate a name of the caller 111. To obtain information about the caller 111, the electronic device 120 and/or the server system 130 may look up social network data associated with a name that matches the name indicated by the caller identification data.

The electronic device 120 uses the identifier 112 to access social network data that is descriptive of a relationship of the caller 111 to the call recipient 121 in a social network. Examples of social networks include Facebook, Twitter, LinkedIn, Google+, MySpace, and Orkut, to name a few. As described further below, electronic social networking platforms may indicate a variety of relationships between human users of the social network. Examples of these relationships include social friendships, family relationships, professional relationships, and affiliations with groups or organizations. Relationships are often represented by connections between user identities corresponding to the respective human users. When a connection exists between user identities, and thus a relationship also exists between the associated human users, one user may be termed a "friend," a "connection," a "follower," or a "subscriber" of another user, or the relationship may have another designation.

In some implementations, the electronic device 120 stores social network data on the electronic device 120 prior to receiving the communication and accesses the stored social network data in response to receipt of the communication. The stored data can include, for example, a list identifying friends of the recipient 121 in the social networking platform or other users directly connected to the recipient 121 in the social networking platform. In the illustrated example, the electronic device 120 accesses social network data 124 from an internal memory device. The social network data 124 is cached data that was received through, for example, interactions of the electronic device 120 with a social networking service before the incoming call is received. This social network data 125 may be stored in an independent data structure, for example, as a data file for a particular application. In addition, or as an alternative, the social network data 125 may be stored with (e.g., combined or merged with) other contact data stored by the electronic device 120, for example, in a contact list or phone book of the electronic device. In some implementations, the electronic device 120 automatically and occasionally (e.g., periodically) retrieves social network data over the network 140, and stores the received data as cached social network data 124. The social network data 124 includes, for example, identifiers for users that have relationships to the recipient 121 in the social networking platform, and data that identifies relationships of those users to the recipient 121. In the illustrated example, the social network data 124 associates phone numbers of various users with their respective relationships to the recipient 121.

Based on receipt of the call, the electronic device 120 compares the identifier 112 with the stored social network data 124. If the electronic device 120 finds the identifier 112 in the social network data 124, the electronic device 120 uses relationship data associated with the identifier 112 to select a call handling option, as described further below. If the electronic device determines that the identifier 112 is not found in the social network data, and thus is not recognized in the social network data 124, the electronic device 120 obtains additional social network data from another source.

In the example of FIG. 1A, the electronic device 120 determines that the identifier 112 (e.g., the phone number of the caller 111, "999-9999") is not present in the social network data 124 and, consequently, that the stored social network data 124 does not identify a social networking relationship for the user associated with the identifier 112. Because the identifier 112 is not recognized in social network data 124 stored at the electronic device 120, the electronic device 120 requests social network data from the server system 130 over the network 140. In the illustrated example, the electronic device 120 sends a request 142 for social network data. The request 142 includes the identifier 112 for the electronic device 110 from which the call originated. The request 142 also includes an identifier 123 for the recipient 121 or the electronic device 120 associated with the recipient 121. For example, the identifier 123 may be a user name (e.g., "User1") or an electronic address for the recipient 121 in the social networking platform. In addition, or as an alternative, the identifier 123 may be a phone number for the electronic device 120 (e.g., the number "555-5555") or another identifier for the electronic device 120. The electronic device 120 sends the request 142 in response to receiving the call. Thus, the electronic device 120 sends the request 142 after the call is received at the electronic device 120 (e.g., while the call is active).

The server system 130 receives the request 142 and obtains data that enables determination of what relationship, if any, exists in the social networking platform between the recipient 121 and a user associated with the identifier 112 (e.g., the caller 111). For example, the server system 130 accesses social network data stored in one or more data storage devices 132 to identify a user identity associated with the identifier 112. The server system 130 then accesses information about social networking connections of the recipient 121 to determine whether the identified user identity has a relationship with the recipient 121 within the social networking platform, and, if so, what relationship exists. The server system 130 may additionally or alternatively access information about social networking connections of the caller 111.

In some implementations, the server system 130 determines that a particular relationship exists between the caller 111 and the recipient 121 within the social networking platform and indicates the determined relationship to the electronic device 120. In other implementations, the server system 130 provides social network data (e.g., such as the identity of the caller 111, a list of social network connections of the caller 111, and/or a list of connections of the recipient 121) and the electronic device 120 examines the social network data to determine what, if any, relationship exists within the social networking platform.

In some instances, the caller 111 may not be directly connected to the recipient 121 in the social networking platform. Nevertheless, the caller 111 may be indirectly related to the recipient 121, through, for example, one or more mutual friends or other connections in the social networking platform. In this regard, the server system 130 compares social networking profile data for the caller 111 and the recipient 121 to determine whether the caller 111 and the recipient 121 have common interests or other commonalities that are reflected in the social networking platform. As another example, the server system 130 determines whether the caller 111 and the recipient 121 are both affiliated with a particular organization in the social networking platform, such as an alumni group or professional organization.

In the illustrated example, the server system 130 determines that a user, the caller 111, is associated with the identifier 112. The server system 130 also determines that the caller 111 is not a friend of, and is not otherwise directly connected to, the recipient 121. The server system 130 analyzes the connections for the caller 111 and the recipient 121 and determines that the caller 111 is a friend of a friend of the recipient 121 in the social networking platform. In other words, the server system 130 determines that at least one of the friends of the recipient 121 in the social networking platform is also a friend of the caller 111 in the social networking platform.

The server system 130 responds to the request 142 by providing social network data 144 to the electronic device 120. The social network data 144 is descriptive of the relationship of the caller 111 to the call recipient 121 in the social networking platform. The social network data 144 can be data from which the relationship can be derived by the electronic device 120, and need not explicitly indicate the relationship. In the illustrated example, the social network data 144 received by the electronic device indicates that the caller 111 is a friend of a friend of the recipient 121 in the social networking platform.

Based on the social network data 144, the electronic device 120 selects a call handling option for the call. In particular, the electronic device 120 selects a call handling option that is designated for calls from callers having the relationship which the caller 111 has with the recipient 121 in the social networking platform. For example, the electronic device 120 selects the call handling option for the call from among multiple different call handling options that are each associated with a particular social networking relationship, or set of social networking relationships. Call handling options can be associated with groups or sets of users, where the sets of users are defined in the social networking platform. A few examples include sets of users designated in a social networking platform as friends, family members, friends of friends, or co-workers. Other examples include users that are unknown to the recipient 121, users included in a subset of a larger set, or users having an affiliation or group membership in common with the recipient 121.

As shown, the electronic device 120 selects the call handling option for the call using call handling rules 145*a*-145*e* that associate call handling options with different social networking relationships. The call handling rules 145*a*-145*e* can be stored at the electronic device 120 (e.g., stored prior to receiving the call), or can be received over the network 140. As described further below, the user of an electronic device may define call handling rules according to his or her preferences. When the call handling rules 145*a*-145*e* are defined based on input from the recipient 121, the response of the electronic device 120 to the call is customized as the recipient 121 desires. Alternatively, the electronic device 120 can use a standard set of call handling rules that is not based on input from the recipient 121. The electronic device 120 can use one or more call handling rules defined by a user and one or more call handling rules that are not defined based on user input.

In the illustrated example, the electronic device 120 selects from among various call handling options that dictate when the electronic device 120 notifies the recipient of an incoming call, and when the electronic device 120 does not output an alert. Call handling options may additionally or alternatively specify other call handling actions. Examples of call handling actions include: providing an alert for the call and permitting the call to be answered; allowing an alert for the call to continue for a particular amount of time; without disconnecting the call, suppressing an alert for the call; blocking or disconnecting the call; forwarding the call to another device; forwarding the call to voicemail; providing a missed call alert after the call terminates; suppressing a missed call alert for the call; adding the call to a call list; excluding the call from a call list; sending a message to the calling device; sending, to the electronic device 110, data regarding a calendar associated with the call recipient; and sending a message to a third device that is different from the electronic device 120 and the electronic device 110.

According to the call handling rule 145a, when a call is received from a caller designated as family member of the recipient 121 within the social networking platform, the electronic device 120 always rings to alert the recipient 121. According to the call handling rule 145b, when a call is received from a caller designated as a friend of the recipient 121 within the social networking platform, the electronic device 120 rings only if the call is received between 7:00 am and 11:00 pm. According to the call handling rule 145c, when a call is received from a caller designated as a friend of a friend of the recipient 121 within the social networking platform, the electronic device 120 rings only if the call is received between 9:00 am and 9:00 pm. According to the call handling rule 145d, when a call is received from a caller designated as a co-worker of the recipient 121 within the social networking platform, the electronic device 120 rings only if the call is received on a weekday. According to the call handling rule 145e, when a call is received from a caller determined to be unknown to the recipient 121 (e.g., unconnected or very remotely connected to the recipient 121 in the social networking platform), the electronic device 120 rings only if the call is received on a weekday between 9:00 am and 6:00 pm.

In some implementations, and in some social networking platforms, some social networking relationships are defined to include a subset of the users that each have another more general relationship to the recipient 121. For example, from a set of friends or direct connections of the recipient 121 in the social networking platform, different subsets of the friends may be further designated as family members, co-workers, etc. Accordingly, in these implementations, each user designated as a family member or co-worker may also be a friend of the recipient 121.

In some implementations, the electronic device 120 uses call handling rules defined so that one call handling option is selected for each call, to the exclusion of the other call handling options. Nevertheless, one call handling option may specify multiple actions to be performed (e.g., allow the call to ring, send a notification to another device, and add an entry to a call log).

In the example of FIG. 1A, the electronic device 120 determines, based on the received social network data 144, that the caller 111 is a friend of a friend of the recipient 121 within the social networking platform, and thus that the call handling rule 145c is applicable. From among the call handling options specified by the various call handling rules 145a-145e, the electronic device 120 selects the call handling option to ring only between 9:00 am and 9:00 pm, as specified by the call handling rule 145c.

The electronic device 120 uses the selected call handling option to perform a call handling action. In the illustrated example, the electronic device 120 determines that the current time (e.g., 4:32 pm) is within the range of time during which alerts should be provided. The electronic device 120 outputs an audible alert 146, such as a ringtone, to indicate that the call has been received. The call is thus handled by the electronic device 120 as specified by the call handling rules 145a-145e, based on the social networking relationship of the caller 111 to the recipient 121.

In some implementations, the electronic device 120 stores, prior to receiving a call, sufficient information to permit determination of the relationship between the caller and the recipient in the social networking platform. For example, prior to receiving the call, the stored social network data 124 may include information about users who are designated as friends, family members, friends of friends, co-workers, etc. of the recipient 121 within the social networking platform. In such implementations, when the electronic device 120 receives a call and the electronic device 120 already stores information that enables determination of the relationship (or lack thereof) between a caller and a recipient, the electronic device 120 determines the relationship without requesting social network data from the server system 130.

In some implementations, to identify a social networking user identity for the caller 111, the electronic device 120 compares caller identification data (e.g., a name of the caller, etc.) with stored social network data 126 and provides the caller identification data to the server system 130. The server system 130 may also compare the caller identification data to social network data or request data associated with the caller identification data from a social networking platform. When a social networking user profile has a name that matches the name indicated in the caller identification data (or when other matching data is identified), the profile may be determined to be a user profile for the caller 111.

The server system 130 in the example of FIG. 1A can be operated by an operator of a social networking platform. Alternatively, the server system 130 can be operated by a third party that does not operate the social networking platform. For example, a third-party server system can provide social network data to users of an application or service that interacts with, or supplements the functionality of, a social networking service provided by the operator of the social network. The operations performed by the server system 130 can be performed by individual computer systems or can be distributed across multiple computer systems. The network 140 can be wired or wireless or a combination of both, and the network 140 can include one or more public or private networks, and can include the Internet.

In some implementations, each of multiple different types of social networking relationships is associated with a different call handling option. However, a one-to-one correspondence between a particular call handling option and a particular social networking relationship type is not required. The same call handling option can be associated with two or more different types of social networking relationships. As an example, calls from family members and friends can be assigned the same call handling option. As another example, calls from friends can be associated with a first call handling option, and calls from all other types of callers can be associated with a second, different call handling option.

In some implementations, the social network data 144 indicates multiple relationships between the caller 111 and the recipient 121. In these implementations, the electronic device 120 accesses a hierarchy of relationships and selects the call handling option corresponding to the relationship that is deemed the closest to the user. For example, if the social network data 144 indicates that a caller 111 is a friend of a friend of the recipient 121, and also that the caller 111 is directly connected as a friend of the recipient 121, the electronic device 120 selects the call handling option based on the direct friendship because it is a closer relationship than an indirect relationship.

In some implementations, the social networking platform from which the social network data 144 is obtained is different from the provider of the communication channel for the call. In the illustrated example, the social networking platform is operated independently of the phone service that is used to provide the call. As another example, where social network data is obtained in response to a video call, social network data may be obtained from a social networking platform separate from the provider of the video call communication channel. Thus the social network data obtained is distinct from, for example, contact lists defined for use with the video call service and maintained by the video communication provider.

Any of a variety of techniques may be used to associate an electronic device with a user. In some implementations, a server system stores data that associates an identifier for a device (e.g., a phone number for a phone) with an identifier for a social networking user identity (e.g., a username or electronic address for the user identity of the owner of the phone). As an example, an electronic device may be associated with a user when the user has registered, with a social networking platform and/or an independent application that provides the social network data, a phone number of the electronic device as being associated with the user. For example, the caller 111 may designate, in a social networking user profile for the caller 111, that the identifier 112 is a phone number for the caller 111.

In some implementations, an electronic device is associated with a user when the user has stored, in memory that resides on the electronic device, a user identifier for the user. The user identifier may identify, for example, a user identity of the user in a social networking platform, or may identify a user account in a third-party service, such as an independent application that provides social network data.

In some implementations, an electronic device is associated with a user when the user is logged into an application on the electronic device and/or a host server. In addition, or as an alternative, an electronic device may be associated with a user when the user is logged into a social networking platform using the electronic device. One or more of these log-ins, or others, may be used to identify a user with which a particular electronic device is associated.

Figure 1B:
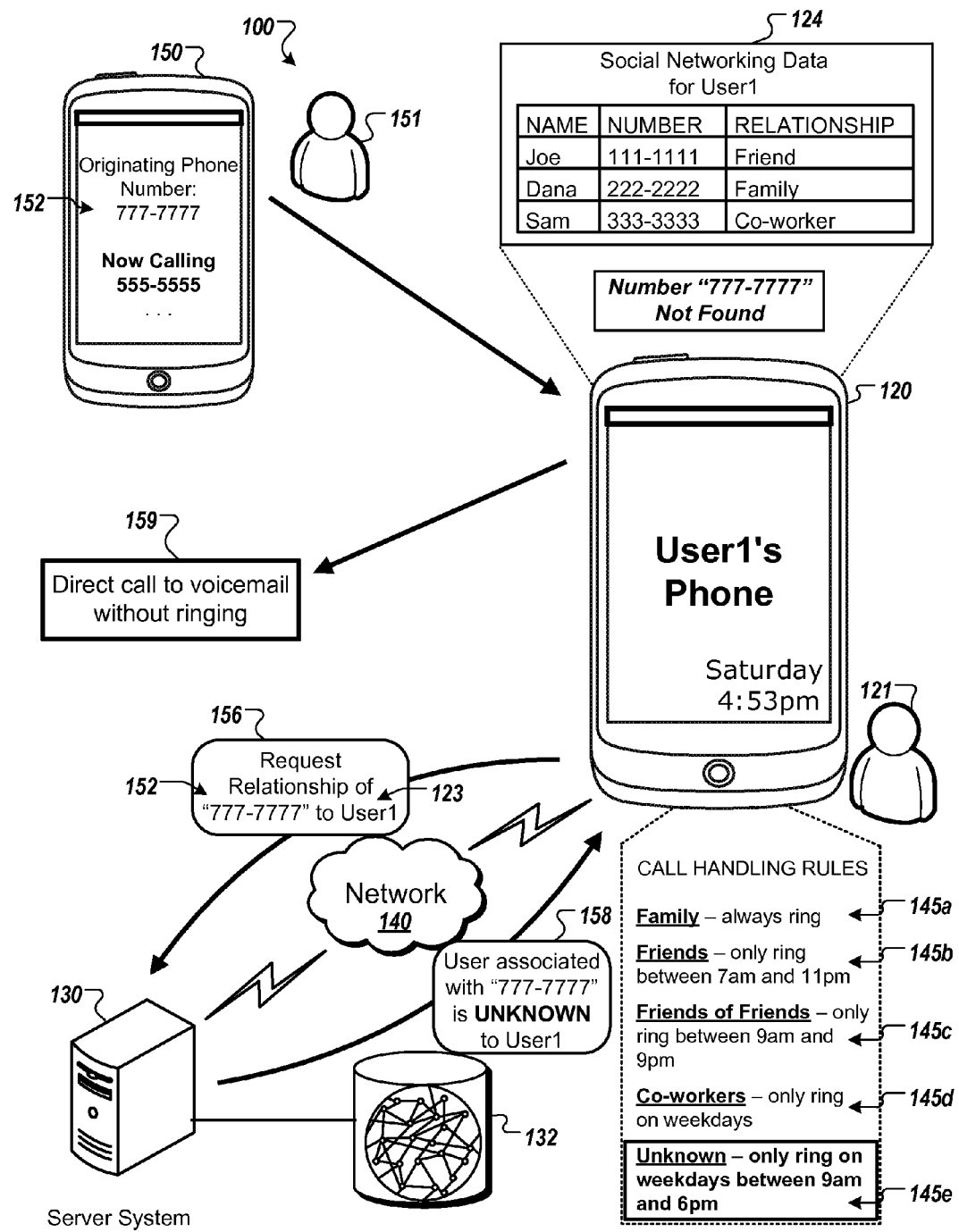

FIG. 1B illustrates another example of the system 100 that handles calls using social network data. In the example of FIG. 1B, the electronic device 120 receives a call from an electronic device 150. The electronic device 150 that originates the call is associated with a caller 151 that is different from the caller 111 of FIG. 1A. The electronic device 150 has an identifier 152, which in the illustrated example, is the phone number "777-7777."

In response to receiving the call, the electronic device 120 compares the identifier 152 with the stored social network data 124. The electronic device 120 determines that the stored social network data 124 does not indicate a relationship of the caller 151 to the recipient 121 in the social networking platform. The electronic device 120 then provides the identifier 152 for the electronic device 150 and the identifier 123 for the recipient 121 to the server system 130 in a request 156 for social network data.

The server system 130 provides social network data 158 that indicates that the caller 111 is unknown to the recipient 121. In this example, the server system 130 determines that the caller 111 is unknown to the recipient 121 because the caller 111 is not connected to the recipient 121 in the social networking platform with any of a predetermined set of relationship types. In some examples, a caller is considered to be unknown when there is no direct connection between the caller and the recipient.

In some implementations, the server system 130 or the electronic device 120 determines whether the caller 151 is unknown based on the proximity of the caller to the recipient 121 in the social networking platform. The caller 151 can be designated as unknown when a separation distance between the caller 151 and the recipient 121 exceeds a threshold. Proximity in the social networking platform may be measured in terms of degrees of separation between the two users. For example, proximity between two users of an electronic social networking platform may be calculated as the fewest number of connections required to link the user identities or user profiles of the corresponding users. When a caller is directly connected to the recipient 121 in the social networking platform, the distance between them is one connection. When a caller is connected to the recipient 121 only through an intermediate user (e.g., when the caller is directly connected to a user that is directly connected to the recipient 121), the distance is two connections. A relationship distance of three can be defined for a caller connected to the recipient 121 only through two intermediate users, and so on. In the illustrated example, the caller 151 is considered unknown or unconnected to the recipient 121 when the distance exceeds two connections (e.g., the relationship is more remote than a friend of a friend).

The electronic device 120 receives the social network data 158 and, based on the social network data 158, determines that the caller 151 is unknown to the recipient 121 within the social networking platform. The electronic device 120 selects a call handling option for the call, using the call handling rules 145a-145e. From among the set of available call handling options, the electronic device 120 selects the call handling option indicated by the call handling rule 145e, which designates, for example, that audible alerts are only provided on weekdays between 9:00 am and 6:00 pm. The electronic device 120 determines that the call is received on a Saturday, and thus not on a weekday, so no audible alert should be produced. Accordingly, the electronic device automatically sends the call to voicemail without ringing or otherwise producing an alert. The recipient 121 thus avoids the nuisance of an unwanted phone call, and is not required to provide any user input at the time of the call to handle the call.

As described above, the call handling option associated with calls from callers of a particular relationship status can be designated by the recipient 121 and stored by the electronic device 120. Thus, any appropriate call handling action, or combination of actions, can be performed based on the relationship of the caller 151 to the recipient 121.

In some implementations, the electronic device 120 stores, prior to receiving a call, sufficient information to permit determination of whether the caller is unknown to the recipient in the social networking platform. When the electronic device 120 stores information that enables determination of the relationship between a caller and a recipient before a call is received, the electronic device 120 may determine that the caller is unknown to the recipient in the social networking platform without requesting social network data from the server system 130.

In some implementations, the electronic device 120 requests social network data from multiple different social networking platforms that have different operators. For example, the recipient 121 (or the caller 111) may have a user identity in each of several different social networking platforms. In this example, the electronic device 120 requests social network data from multiple of the social networking platforms. The electronic device 120 selects the call handling option for the call based on data from any of the social networking platforms, including based on a combination of data received from different social networking platforms.

As an example, the electronic device 120 determines that a caller and a recipient are unconnected in a first social networking platform, but are connected as friends in a second, independently-operated social networking platform. By requesting and receiving social network data from the first social networking platform and the second social networking platform, the electronic device 120 determines the friend relationship, even though it is not present in each of the social networking platforms. As another example, the electronic device 120 determines that a caller is a friend of a particular user in a first social networking platform, and the recipient is a friend of the particular user in a second, different social networking platform. Even if the caller and the recipient do not have any mutual friends in a single social networking platform, the electronic device 120 obtains information identifying the friends of the caller and the friends of the recipient in both social networking platforms. By combining the data from the two social networking platforms, the electronic device 120 determines that the caller is a friend of a friend of the recipient, even though the information is not reflected in data from any single social networking platform.

Figure 1C:
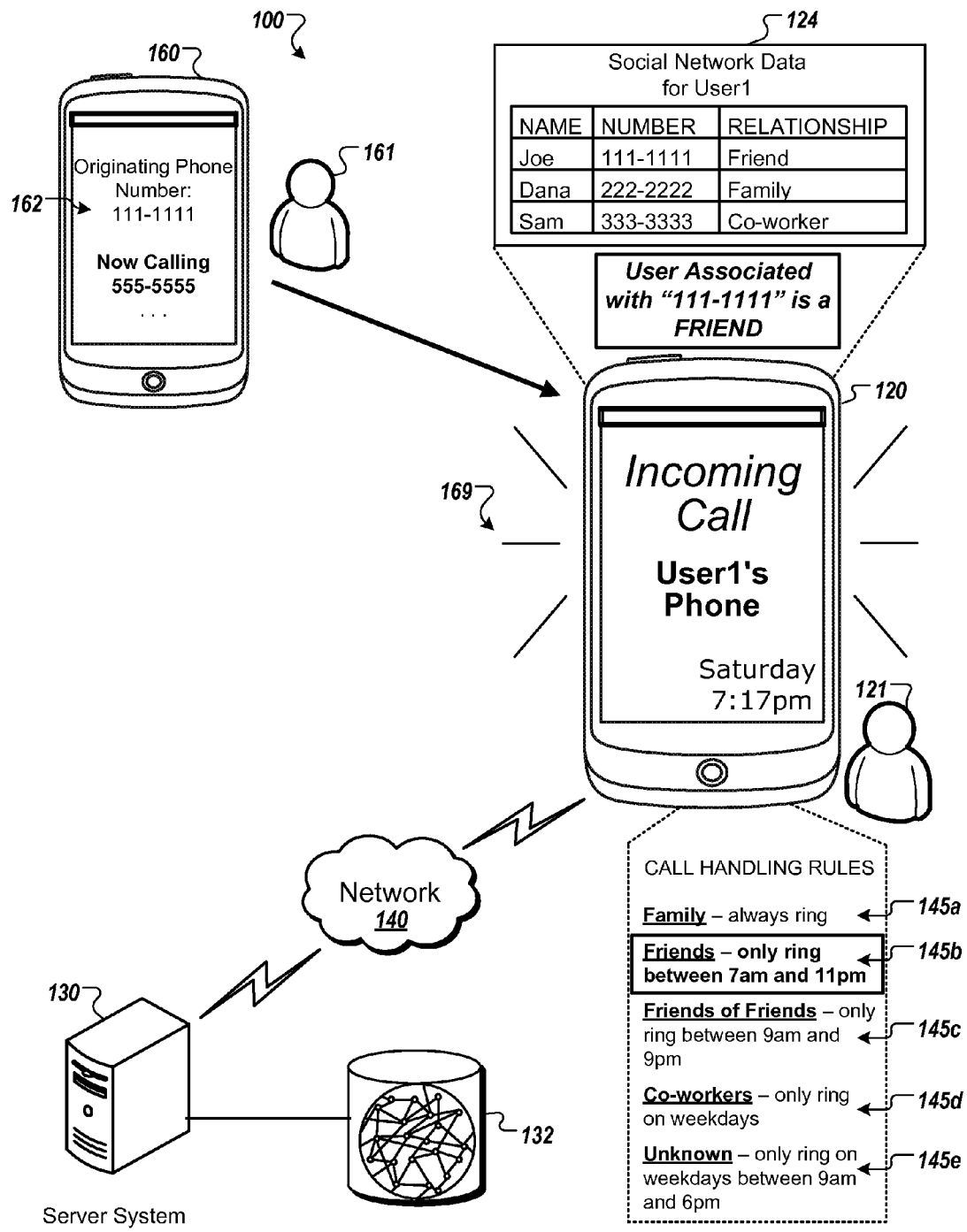

FIG. 1C illustrates another example of the system 100 that handles calls using social network data. In the example of FIG. 1C, the electronic device 120 receives a call from an electronic device 160. The electronic device 160 is associated with a caller 161 that is different from the caller 111 of FIG. 1A and the caller 151 of FIG. 1B. The electronic device 160 has an identifier 162, which is the phone number "111-1111" in the illustrated example.

In response to receiving the call, the electronic device 120 compares the identifier 162 with the stored social network data 124. From the results of the comparison, the electronic device 120 determines that the identifier 162 is associated with a friend of the recipient 121 within the social networking platform. Because the stored social network data 124 indicates the relationship of the caller 161 to the recipient 121 within the social networking platform, and because the social network data 124 is present at the electronic device 120 when the call is received, the electronic device 120 does not need to request or receive additional social network data over the network 140.

Having determined that the caller 161 is a friend of the recipient 121 within the social networking platform, the electronic device 120 selects an appropriate call handling option from among the call handling options specified by the various call handling rules 145a-145e. In the illustrated example, the electronic device 120 selects the call handling option indicated by the call handling rule 145b, to provide an audible alert if the call is received between 7:00 am and 11:00 pm. The electronic device 120 determines the time of the call (e.g., 7:17 pm). The electronic device 120 also determines that, according to the selected call handling option, the time of the call is within the range of time that audible alerts should be provided. In response, the electronic device 120 outputs an alert 169 that notifies the recipient 121 of the call, allowing the recipient 121 to answer the call if the recipient chooses.

The examples of FIGS. 1A-1C illustrate call handling actions in response to initiation of an interactive communication (e.g., a voice call or video call). Connections or relationships in a social networking platform can additionally or alternatively be used to select operations to be performed in response to other communication events (e.g., the termination of a call, or a discrete event such as the receipt of a text message or e-mail message).

In addition, in some implementations, the same call handling option is associated with two or more different types of relationships in the social networking platform. For example, a user may designate a particular call handling option for calls received from callers designated as family members within the social networking platform, and the user may designate the same call handling option for calls received from friends of the recipient within the social networking platform. Of course, in some implementations, the call handling options designated for calls from different sets of users are different, as described above.

Figure 2A:
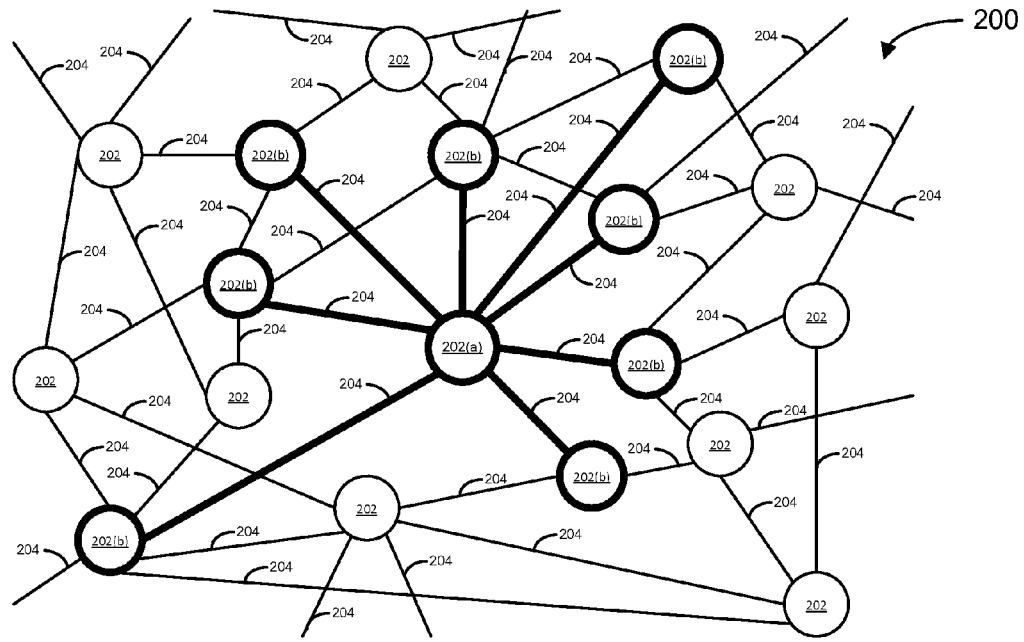
FIGS. 2A and 2B are schematic diagrams illustrating examples of electronic social networking platforms.

FIG. 2A illustrates an example of an electronic social networking platform. As illustrated in FIG. 2A, the electronic social networking platform is represented as a graph 200 of nodes 202 connected by edges 204. In some implementations, each node 202 of graph 200 represents an individual user identity of the electronic social networking platform. In such implementations, an edge 204 that connects two nodes 202 represents a connection that has been formed between the two user identities that are represented by the connected nodes 202. For example, the edges 204 that connect node 202(a) to nodes 202(b) represent connections that have been formed within the electronic social networking platform between the user identity represented by node 202(a) and the other user identities represented by nodes 202(b).

There are many different examples of electronic social networking platforms. As described above, Facebook, Twitter, LinkedIn, Google+, MySpace, and Orkut are a few examples. But, there are many others, and it is reasonable to expect many more to be launched in the future.

Electronic social networking platforms frequently enable individual user identities (e.g., users who have registered with a platform and/or who have been assigned a unique or otherwise identifying identifier by the platform) to establish connections with other user identities. These connections between user identities may reflect relationships between the underlying human users who correspond to the user identities. For example, a connection between two user identities within an electronic social networking platform may reflect a social friendship (e.g., developed through physical interaction in the real-world and/or through on-line interaction in the cyber-world) or a professional relationship between the underlying human users who correspond to the user identities.

In some electronic social networking platforms, a user identity may be able to unilaterally form a connection with another user identity. For example, an electronic social networking platform may enable a first user identity to form a connection to a second user identity simply by specifying a desire to form a connection to the second user identity and without requiring approval of the connection by the second user identity. Alternatively, in other electronic social networking platforms, the formation of connections between two user identities may be a bilateral process. For example, in such electronic social networking platforms, when a first user identity specifies a desire to form a connection to a second user identity, the electronic social networking platform may establish the connection only after the second user identity approves the formation of the connection between the first user identity and the second user identity.

The connections formed between individual user identities within an electronic social networking platform may be represented in the form of a graph, where user identities are represented by nodes and connections between user identities are represented by edges connecting the nodes. Such a graph of interconnected user identities may change dynamically in time as new user identities join and old user identities quit the electronic social networking platform and/or as new connections are formed and old connections are dissolved. Proximity between two user identities of an electronic social networking platform may be measured in terms of degrees of separation between the two user identities. For example, proximity between two user identities of an electronic social networking platform may be calculated as the fewest number of edges required to form a path between the two user identities within the graph representing the connections between user identities of the electronic social networking platform.

A user identity of an electronic social networking platform may form connections to other user identities of the electronic social networking platform, thus forming a personal social network defined within the overall social networking platform. As used herein, the social network of a particular entity refers to the connections and entities for the particular entity, which form a subset of the entities and connections in the broader social networking platform, which encompasses the user identities for all entities and the connections among them. In some cases, the social network of a particular user identity of an electronic social networking platform may be defined as the group of other user identities to whom the particular user identity is directly connected. Alternatively, in other cases, the social network of a particular user identity of an electronic social networking platform may be defined to include a group of other user identities that are within a threshold number of degrees of separation of the particular user identity within the graph.

Electronic social networking platforms commonly facilitate sharing of information and the exchange of electronic communications between user identities and other user identities who are part of their social networks. In some implementations, an electronic social networking platform may allow a particular user identity to access more detailed profile information about the other user identities who are part of the particular user identity's social network than the electronic social networking platform allows the particular user identity to access about user identities who are not part of the particular user identity's social network. For example, an electronic social networking platform may allow a particular user identity to access information about the hometowns and/or the current cities of residence of other user identities who are part of the particular user identity's social network, but the electronic social networking platform may not allow the particular user identity to access this same information for user identities who are not part of the particular user identity's social network.

Additionally or alternatively, an electronic social networking platform may provide communication conduits between a particular user identity and the other user identities who are part of the particular user identity's social network that the electronic social networking platform does not otherwise provide between the particular user identity and other user identities who are not part of the particular user identity's social network.

Furthermore, some electronic social networking platforms may enable user identities to record information within the electronic social networking platforms about locations they have visited. In addition, these electronic social networking platforms may enable a particular user identity to access such information about locations that members of the particular user identity's social network have registered with the social networking platforms. However, these electronic social networking platforms may not allow a particular user identity to access similar information about locations that other user identities who are not members of the particular user identity's social network registered with the social networking platforms. In some electronic social networking platforms, when a user identity registers a location that the user identity has visited, messages may be broadcast to members of the user identity's social network reporting that the user identity has registered the location as a location that the user identity has visited.

As discussed above, in some cases, an electronic social networking platform may define a particular user identity's social network as the group of other user identities to whom the user identity is directly connected. If this definition is applied within the electronic social networking platform illustrated in FIG. 2A, the social network for the user identity represented by node $202(a)$ would be defined as the group of other user identities represented by nodes $202(b)$.

In addition to enabling a user identity to establish connections to other user identities and thereby form a social network, some electronic social networking platforms may enable a particular user identity to divide the user identity's social network into one or more subsets of user identities who may, for example, share one or more characteristics of significance to the particular user identity. For example, a particular user identity of an electronic social networking platform may wish to define subsets of user identities within the particular user identity's social network that reflect other user identities with whom the particular user identity has a familial relationship, a professional relationship, or a social relationship. For ease of reference, such defined subsets of a particular user's social network may be referred to herein as "Friendlists."

As further discussed above, an electronic social networking application may facilitate the sharing of information and the exchange of electronic communications between a particular user identity and other user identities who are part of the particular user identity's social network. For example, referring to the electronic social networking platform represented in FIG. 2A, the electronic social networking application may provide mechanisms that facilitate the exchange of electronic communications between the user identity represented by node $202(a)$ and the user identities represented by nodes $202(b)$ who are part of the social network of the user identity represented by node $202(a)$. In some implementations, the electronic social networking application may provide a mechanism that enables the user identity represented by node $202(a)$ to send private electronic messages to any one or more of the user identities represented by nodes $202(a)$. Furthermore, the electronic social networking application also may provide a mechanism that enables the user identity represented by node $202(a)$ to broadcast an electronic message that is shared publicly with all (or some defined subset of all, such as, for example, one or more "Friendlists") of the user identities represented by nodes $202(b)$. Additionally or alternatively, the electronic social networking application may provide a mechanism that enables the user identity represented by node $202(a)$ to send a directed electronic message to a user identity that is represented by a particular one of nodes $202(b)$. In such cases, the recipient user identity of the directed message may determine whether this directed message is shared publicly with other user identities of the electronic social networking platform.

In addition to enabling user identities to establish connections to other user identities, some electronic social networking platforms enable user identities to establish connections with other types of objects. For example, some social networking platforms may enable user identities to record information about their hometowns, current places of residence, or places they have visited (including geographic locations (e.g., such as cities, states, or countries) as well as commercial venues, local businesses, or places (e.g., such as restaurants, retail stores, parks, train or bus stations, airports, etc.)) by establishing connections to location objects within the electronic social networking platforms.

Additionally or alternatively, some social networking platforms may enable user identities to generate event objects within the electronic social networking platforms that represent events that they are hosting. After creating event objects for such events, user identities may be provided with mechanisms for inviting other user identities to the events. Furthermore, a connection may be established between an event object and a user identity within an electronic social networking platform as a result of the user identity being invited to the event and/or as a result of the user identity registering with the electronic social networking platform that the user identity will be attending the event.

Similarly, some social networking platforms may enable user identities to record endorsements of various different types of interests, for example, by establishing connections to interest objects that represent these interests. Such interest objects may include a variety of different types of objects including, for example, non-personal enterprise objects. Examples of such non-personal enterprise objects may include, among others, local businesses or places (e.g., restaurants, retail stores, parks, train or bus stations, airports, etc.); companies, organizations, or institutions; brands or products; artists, bands, or public figures; forms of entertainment (e.g., books, music albums, movies, etc.); and causes or communities. In some electronic social networking platforms, interest objects, including non-personal enterprise objects, may be manifested within the electronic social networking platforms as so-called "pages." These pages, especially pages associated with non-personal enterprise interest objects, may be maintained by one or more representatives of the interests or non-personal enterprises represented by the objects. In addition, among other features, these pages may provide information about the interests or non-personal enterprises represented by the objects. These pages also may provide conduits for enabling interaction between the interest or non-personal enterprise objects and the user identities that have formed connections to the objects that represent them.

Furthermore, some social networking platforms may enable user identities to establish connections with independent applications that leverage the social networking platforms, for example, by granting the independent applications authorization to access or extract data from the electronic social networking platform on their behalf.

Figure 2B:
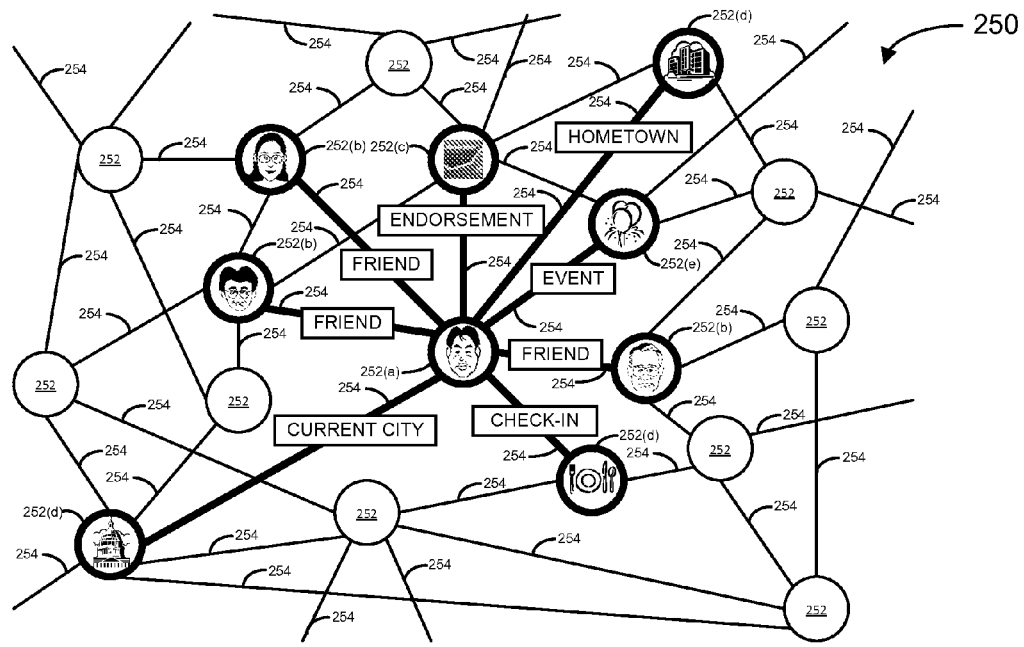

FIG. 2B illustrates an example of an electronic social networking platform. The example of FIG. 2B illustrates a social networking platform that enables user identities to form connections with multiple different types of objects including, for example, other user identity objects, location objects, event objects, and interest objects (e.g., non-personal enterprise objects). As illustrated in FIG. 2B, the electronic social networking platform is represented as a graph 250 of nodes 252 connected by edges 254. Each node 252 in the graph 250 represents a particular type of object in the electronic social networking platform. For example, nodes 252(a) and 252(b) represent user identity objects, while node 252(c) represents a non-personal enterprise object, nodes 252(d) represent location objects, and node 252(e) represents an event object.

An edge 254 that connects two nodes 252 represents a connection that has been formed between the two objects that are represented by the connected nodes 252. For example, the edges 254 that connect node 252(a) to nodes 252(b) represent connections that have been formed between the user identity represented by node 202(a) and the user identities represented by nodes 252(b). (For ease of reference, such a connection between two user identity objects in an electronic social networking platform may be referred to herein as a "friend" connection.)

Similarly, the edge 254 that connects node 252(a) to node 252(c) represents a connection between the user identity represented by node 252(a) and the non-personal enterprise object represented by node 252(c). (As discussed above, a user of an electronic social networking platform may form a connection to such a non-personal enterprise object in order to record an endorsement of the non-personal enterprise represented by the object. Therefore, for ease of reference, connections between a user identity object and a non-personal enterprise object in an electronic social networking platform may be referred to herein as an "endorsement" connection.)

Furthermore, the edges 254 that connect node 252(a) to nodes 252(d) represent connections that have been formed between the user identity represented by node 252(a) and the location objects represented by nodes 252(d). Depending on the electronic social networking platform, a user identity may be able to establish various different types of connections to location objects.

For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" connection to a location object that represents the user identity's current residence.

Moreover, in order to store a record of a place the user identity visited (including geographic locations (e.g., such as cities, states, or countries) as well as commercial venues, local businesses or places (e.g., such as restaurants, retail stores, parks, train or bus stations, airports, etc.)), the user identity may establish what may be referred to herein as a "check-in" connection to a location object that represents a place that the user identity visited. In some cases, an electronic social networking platform may provide mechanisms that enable a user identity to manually "check-in" at a location. For example, a social networking platform may provide mechanisms that enable a user identity to manually define and/or search for a location object that corresponds to a location that the user identity is visiting (or has visited or plans to visit) and create a connection to the location object that corresponds to the location in order to "check-in" at the location. Additionally or alternatively, an electronic social networking platform may provide mechanisms that enable a user identity to "check-in" at a location in a more intelligent or automated fashion. For instance, a social networking platform may provide mechanisms that enable a user identity to "check-in" at a location using a mobile computing device (e.g., a smartphone or tablet computer) using global positioning system (GPS) and/or map data available to the mobile computing device.

Finally, the edge 254 that connects node 252(a) to node 252(e) represents a connection that has been formed between the user identity represented by node 252(a) and the event represented by event object node 252(e). (For ease of reference, such a connection between a user identity object and an event object may be referred to herein as "event" connections.) There may be various different types of event connections between user identities and event objects in a social networking platform. For example, one type of an event connection between a user identity and an event object in a social networking platform may signify that the user identity is the host of the event. Another type of an event connection between a user identity and an event object in a social networking platform may signify that the user identity has been invited to the event. Still another type of event connection between a user identity and an event object in a social networking platform may signify that the user identity has registered with the electronic social networking platform that the user identity will be attending the event. Yet another type of event connection between a user identity and an event object in a social networking platform may signify that the user identity has registered with the electronic social networking platform that the user identity will not be attending the event. Still one more type of event connection between a user identity and an event object in a social networking platform may signify that the user identity has registered with the electronic social networking platform that the user identity tentatively will be attending the event.

In some electronic social networking platforms that enable user identities to form connections with object types like location objects, event objects, and interest objects (e.g., non-personal enterprise objects), such location objects, event objects, and/or interest objects (e.g., non-personal enterprise objects) each may be associated with one or more representatives. Furthermore, the electronic social networking platforms may enable these representatives to interact with the user identities to whom the objects are connected using the manifestation of the object within the electronic social networking platform.

For example, a non-personal enterprise object within an electronic social networking platform may be manifested as a "page" that provides information about the non-personal enterprise that the object represents, and the electronic social networking platform may enable one or more designated representatives associated with the "page" to share information and exchange electronic communications with the user identities connected to the non-personal enterprise object in a manner in which such shared information or exchanged communications appear to involve the "page" as opposed to an individual user identity. In one particular example, the electronic social networking platform may provide a mechanism that enables one or more representatives associated with the non-personal enterprise to broadcast an electronic message that is shared publicly with all (or some defined subset of all) of the user identities to which the non-personal enterprise object is connected.

Additionally or alternatively, an event object within an electronic social networking platform also may be manifested as an "event page" that provides information about the event the object represents (e.g., date, time, and location information for the event), and the electronic networking platform may enable one or more designated representatives associated with the event (e.g., the hosts) to share information and exchange electronic communications with user identities who have been invited to the event via the "event page." In some electronic social networking platforms, both personal user identities and non-personal enterprise objects (and their representatives) may be able to create and host events.

Electronic social networking platforms often enable user identities to maintain user profiles or other collections of data that include information about the user identities to whom they correspond. Such a profile for an individual user identity of an electronic social networking platform may include, among other information, information about the user identity's hometown, current residence, age, gender, relationship status, educational background, and/or professional background. Additionally or alternatively, the profile for an individual user identity of an electronic social networking platform may include records of various different interests of the user identity (e.g., endorsements of non-personal enterprises or other interests).

In some implementations, a profile for a user identity may include one or more phone numbers, electronic communication addresses (e.g., electronic mail addresses, Twitter feed address, etc.), or other identifiers. When a particular identifier is provided to the social networking platform, the social networking platform can look up the user identity associated with that particular identifier. For example, users may store their telephone numbers in their social networking profiles, thereby associating their phone numbers with their user identities in the social networking platform. To obtain information about a user identity associated with a phone number, an electronic device or a third party server system may provide the phone number to the social networking platform. The social networking platform searches among the user profiles for a user profile that includes the provided phone number. If a profile in the social networking platform includes the provided phone number, the social networking platform may provide information about the user identity having the profile that includes the phone number.

In some implementations, a third-party server system (rather than a social networking platform) identifies a user identity or profile that corresponds to an identifier, such as a phone number. For example, a third-party server may store cached data that has been extracted from one or more social networking platforms. The third party-server searches among the cached data to identify a profile that includes, or is otherwise associated with, a particular phone number. The cached data may include cached user profiles or other data that associates identifiers for user identities (e.g., usernames) with corresponding phone numbers. In response to a request for data associated with a particular phone number, the third-party server finds the phone number in the cached data. The third-party server may then provide cached social network data associated with the phone number, if available. Alternatively, the third-party server may use an identifier for the user identity that is associated with the particular phone number to obtain social network data about the user identity data from a social networking platform, and provide the obtained social network data.

In some electronic social networking platforms, at least some of the profile information recorded for an individual user identity may be represented by connections between the user identity and other types of objects within the electronic social networking platforms. For example, information about a user identity's hometown and/or current residence may be represented as a connection between the user identity and one or more different location objects, for example, as described above in connection with FIG. 2B. Additionally or alternatively, information about a user identity's interests may be represented as connections between the user identity and one or more different interest objects (e.g., non-personal enterprise objects), for example, as also described above in connection with FIG. 2B.

Figure 3:
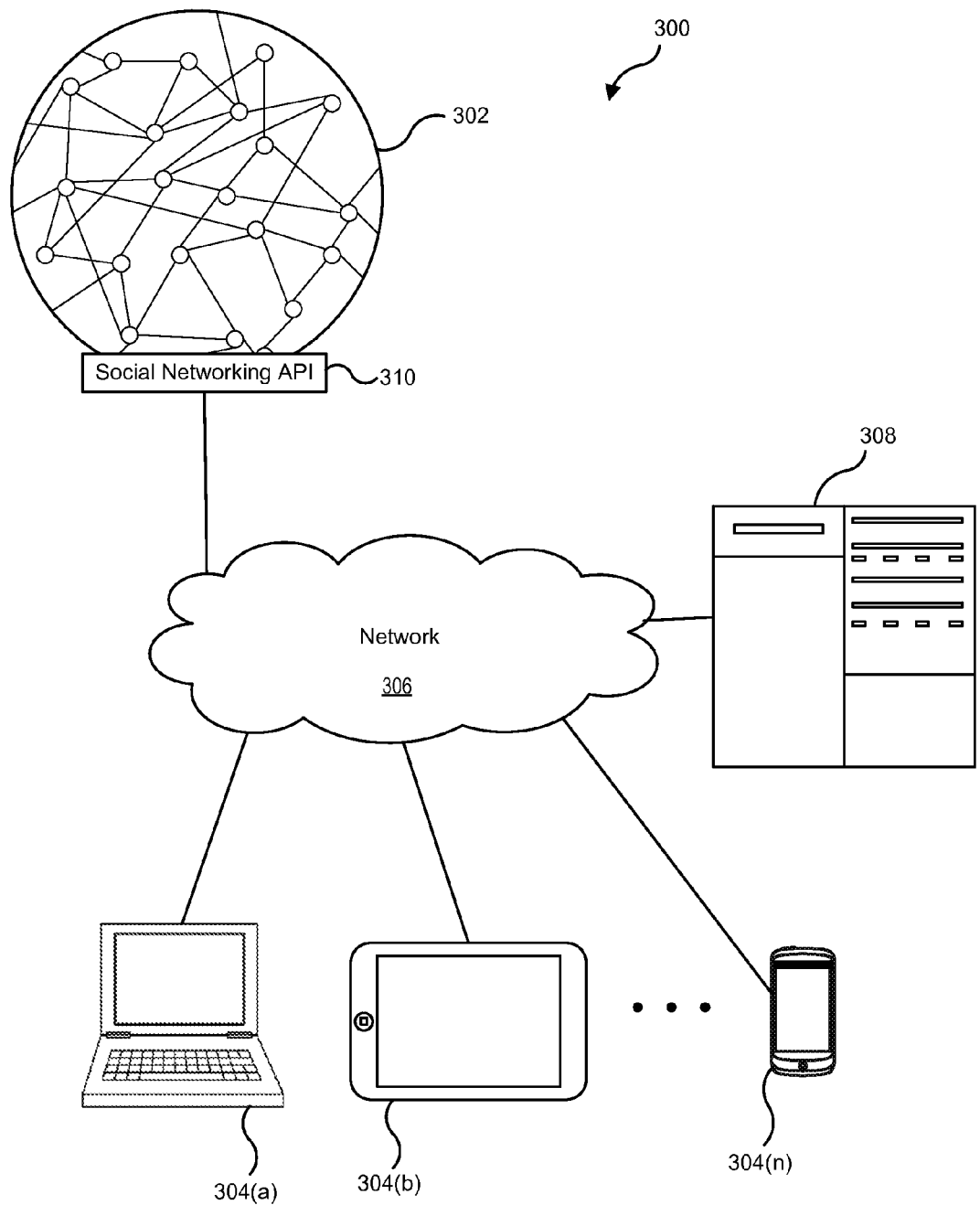
FIG. 3 is a block diagram illustrating an example of a communications system.

FIG. 3 illustrates an example of a communications system 300. For illustrative purposes, several elements illustrated in FIG. 3 and described below are represented as monolithic entities. However, these elements each may include and/or be implemented on numerous interconnected computing devices and other components that are designed to perform a set of specified operations.

As illustrated in FIG. 3, the communications system 300 includes an electronic social networking platform 302 that is accessible to a number of computing devices or other electronic devices 304(a)-304(n), including, for example, a laptop computer 304(a), a tablet computer 304(b), and a smartphone 304(n), over a network 306. In addition, the communications system 300 also includes a computing system 308. The computing system 308 may be external to the electronic social networking platform 302. As such, the electronic social networking platform 302 may be accessible to the computing system 308 over the network 306. Additionally, the computing system 308 may be accessible to the electronic devices 304(a)-304(n) over the network 306.

The electronic social networking platform 302 may be implemented using one or more computing devices (e.g., servers) configured to provide a service to one or more client devices (e.g., electronic devices 304(a)-304(n)) connected to electronic social networking platform 302 over network 306. The one or more computing devices on which electronic social networking platform 302 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 302. Furthermore, the one or more computing devices on which the electronic social networking platform 302 is implemented each may include one or more processors for executing instructions stored in storage and/or received from one or more other electronic devices, for example over the network 306. In addition, these computing devices also typically may include network interfaces and communication devices for sending and receiving data. The electronic social networking platform 302 also may provide an application programming interface (API) 310 that enables other applications to interact with and extract data from the electronic social networking platform 302.

The electronic devices 304(a)-304(n) may be any of a number of different types of computing devices including, for example, mobile phones; smartphones; personal digital assistants; laptop, tablet, and netbook computers; and desktop computers including personal computers, special purpose computers, general purpose computers, and/or combinations of special purpose and general purpose computers. Each of the electronic devices 304(a)-304(n) typically may have internal or external storage components for storing data and programs such as an operating system and one or more application programs. In particular, the internal or external storage components for each of the electronic devices 304(a)-304(n) may store a client application for interfacing with the electronic social networking platform 302 and/or a client application for interfacing with the computing system 308. Additionally or alternatively, the electronic devices 304(a)-304(n) may be configured to interface with the electronic social networking platform 302 or the computing system 308 without a specific client application, using, for example, a web browser.

Each of the electronic devices 304(a)-304(n) also typically may include a central processing unit (CPU) for executing instructions stored in storage and/or received from one or more other electronic devices, for example over the network 306. Each of the electronic devices 304(a)-304(n) also usually may include one or more communication devices for sending and receiving data. One example of such communications devices is a modem. Other examples include antennas, transceivers, communications cards, and other network adapters capable of transmitting and receiving data over a network (e.g., the network 306) through a wired or wireless data pathway.

The network 306 may provide direct or indirect communication links between the electronic social networking platform 302, the electronic devices 304(a)-304(n), and the computing system 308. Examples of the network 306 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

The computing system 308 may be implemented using one or more computing devices (e.g., servers). The one or more computing devices on which computing system 308 is implemented may have internal or external storage components storing data and programs such as an operating system and one or more application programs. The one or more application programs may be implemented as instructions that are stored in the storage components and that, when executed, cause the one or more computing devices to provide the features ascribed herein to the computing system 308. Furthermore, the one or more computing devices on which the computing system 308 is implemented each may include one or more processors for executing instructions stored in storage and/or received from one or more other electronic devices, for example, over the network 306. In addition, these computing devices also typically may include network interfaces and communication devices for sending and receiving data.

The computing system 308 may host an application that leverages electronic social networking platform 302. As such, the computing system 308 may be configured to extract and process data from electronic social networking platform 302. For example, the computing system 308 may be configured to exploit the API 310 to extract data from the electronic social networking platform 302. Among other features, the computing system 308 may be configured to extract data about multiple different user identities' social networks including (i) information identifying the members of each user identity's social network; (ii) communications shared with each user identity as well as communications shared with each member of the user identity's social network; (iii) information about locations where each user identity has checked-in as well as information about locations where each member of the user identity's social network has checked-in; and (iv) contact information (e.g., telephone numbers) for each member of the user identity's social network. Information from the extracted data is used to select appropriate call handling options for received calls. As an example, information about members of a caller's social network and information about members of a recipient's social network permits an electronic device or server system to determine whether there are common members, and thus that the caller is a friend of a friend of the recipient. As another example, information about locations where a caller has checked-in can be used to select or modify a call handling option based on location, as described further below.

In some implementations, the electronic social networking platform 302 may enable individual user identities to grant the computing system 308 a token that defines permission levels related to data about the user identities' social networks that computing system 308 may access and extract from electronic social networking platform 302. For each individual user identity for which the computing system 308 has a token, the computing system 308 may extract information about the user identity and the other user identities who are members of the user identity's social network. This information may include identifying information for the user identity and each member of the user identity's social network as well as demographic information for the user identity and each member of the user identity's social network (e.g., hometown, current residence, age (or date of birth), gender, relationship status, etc.).

For each individual user identity for which the computing system 308 has a token, the computing system 308 also may extract communications that have been shared with the user identity, information about interest objects the user identity has endorsed, information about locations where the user identity has checked-in, and/or information about events to which the user identity has been invited. Additionally or alternatively, for each individual user identity for which the computing system 308 has a token, the computing system 308 also may extract communications that have been shared with members of the user identity's social network, information about interest objects that members of the user identity's social network have endorsed, and/or information about locations where members of the user identity's social network have checked-in. This information can be used to determine, for example, whether a caller is within a threshold distance of the call recipient, or whether the caller has recently experienced a significant event, either or both of which may be used to select or modify a call handling option, as described further below. In some implementations, after extracting data from the electronic social networking platform 302, the computing system 308 may store the extracted data in one more databases.

In FIG. 3, the computing system 308 may represent the server system that provides social network data to the electronic device 120 of FIGS. 1A-1C, enabling the electronic device to make call handling decisions. The electronic devices 304(a)-304(n) may each perform the functions of the electronic devices 110, 120 of FIGS. 1A-1C. That is, any of the electronic devices 304(a)-304(n) may initiate calls or other communications, as described for the electronic device 110. Further, any of the electronic devices 304(a)-304(n) may receive calls and handle the calls based on social network data, as described above for the electronic device 120.

Figure 4:
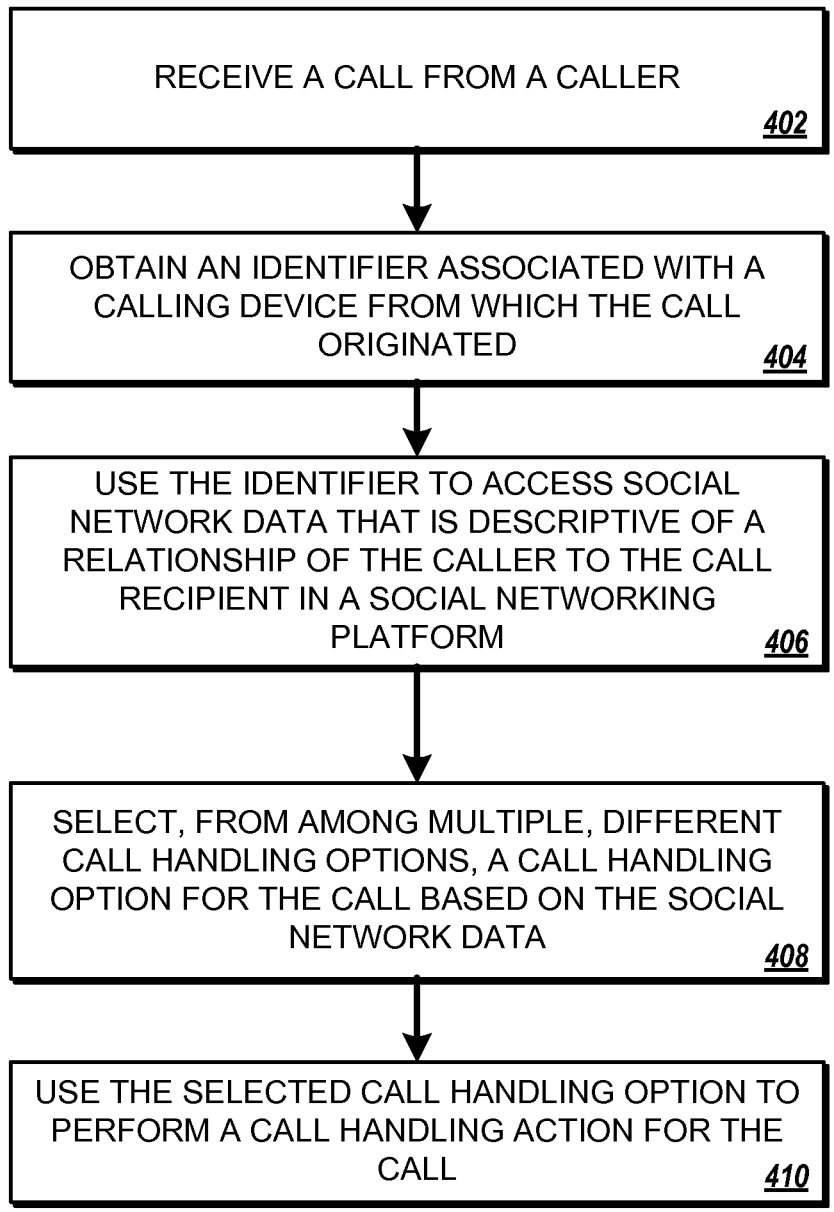
FIG. 4 is a flow diagram illustrating an example of a process for handling calls using social network data.

FIG. 4 illustrates an example of a process 400 for handling calls using social network data. The process 400 can be performed by an electronic device, such as the electronic device 120 of FIG. 1.

The electronic device 120 receives a call from a caller (402). The electronic device is associated with a call recipient. For instance, the call can be an incoming phone call received at a phone associated with the call recipient.

The electronic device 120 identifies an identifier associated with a calling device from which the call originated (404). For instance, the electronic device 120 may identify a phone number associated with a phone from which the call originated.

The electronic device 120 uses the identifier to access social network data that is descriptive of a relationship of the caller to the call recipient in a social networking platform (406). For instance, the electronic device 120 may access, from a storage unit of the electronic device 120, social network data received, prior to receiving the call, from a social networking service that operates the social network, the social network data being descriptive of the relationship of the caller to the call recipient. As another example, after receiving the call and before using a call handling option to perform a call handling action associated with the call, the electronic device 120 may provide the identifier to a social networking service that operates the social network, and receive, over a network and from the social networking service that operates the social network, the social network data. In addition, or as an alternative, the electronic device 120 may provide the identifier to, and receive social network data from, a server system that is not part of a social networking service that operates the social network (e.g., a server system for a third-party service or application).

In some implementations, the electronic device 120 requests, from each of multiple social network services that each operate a different social networking platform, social network data that is indicative of a relationship of the caller to the call recipient. The electronic device 120 receives social network data from each of the multiple different social network platforms. In some instances, the electronic device 120 receives social network data from a first social networking platform and a second social networking platform of the at least two of the multiple different social networking platforms, where the data from the first social networking platform and the data from the second social networking platform are descriptive of a relationship between the caller and the call recipient. The electronic device 120 determines a relationship between the caller and the call recipient based on the social network data received from the first social networking platform and based on the social network data received from the second social networking platform.

In some implementations, the electronic device 120 interfaces with server systems for various different social networking platforms to obtain social network data. In other implementations, the electronic device 120 obtains social network data from one or more third-party server systems, and the third-party server systems obtain social network data from social networking platforms. As an example, the electronic device 120 requests social network data from a third party server system. The third-party server system obtains social network data from each of multiple social networking platforms, or accesses stored data from each of multiple social networking platforms. The electronic device 120 receives, from the third-party server system, aggregated social network data from the multiple different social networking platforms.

The electronic device 120 selects a call handling option for the call based on the social network data that is descriptive of the relationship of the caller to the call recipient in the social networking platform (408). The electronic device 120 selects the call handling option from among multiple, different call handling options. The electronic device 120 may select the call handling option from among a plurality of call handling options that are each associated, prior to receiving the call, with a different relationship to the call recipient in the social networking platform. For instance, the electronic device 120 may select the call handling operation for the call from among a set of call handling operations that includes, for example, allowing the electronic device to produce an audible alert, directing the call to voicemail without ringing, and blocking the call.

In some implementations, the electronic device 120 selects the call handling option from among a set of call handling options designating different call handling actions. The different call handling actions may include any appropriate combination of two or more of: (1) providing an alert for the call and permitting the call to be answered; (2) without disconnecting the call, suppressing an alert for the call; (3) blocking or disconnecting the call; (4) forwarding the call to another device; (5) forwarding the call to voicemail; (6) providing a missed call alert after the call terminates; (7) suppressing a missed call alert for the call; (8) adding the call to a call list; (9) excluding the call from a call list; (10) sending a message to the calling device; (11) sending, to the calling device, data regarding a calendar associated with the call recipient; and (12) sending a message to a third device that is different from the electronic device and the calling device.

In some implementations, the electronic device 120 determines, based on the social network data, a relationship of the caller to the call recipient in the social networking platform (e.g., determines the relationship between their respective user identities in the social networking platform). The electronic device 120 accesses call handling data that associates each of the multiple, different call handling options with a different relationship to the call recipient in the social networking platform. The electronic device 120 compares the determined relationship to the call recipient with the accessed call handling data. Based on comparison results, the electronic device 120 selects a call handling option designated for calls received from callers having the determined relationship to the call recipient.

In some implementations, the electronic device 120 determines, based on the social network data, a connection type of a connection between the caller and the call recipient in the social networking platform. The connection type is selected from a set of connection types including at least connection types of directly connected, indirectly connected, and unconnected. In response to determining the connection type of a connection between the caller and the call recipient in the social networking platform, the electronic device 120 selects, as the call handling option for the call, a call handling option that was associated with the determined connection type prior to receiving the call. The call handling option is selected from among a set of call handling options that includes at least: (i) a first call handling option associated with the connection type of directly connected; (ii) a second call handling option associated with the connection type of indirectly connected, the second call handling option being different from the first call handling option; and (iii) a third call handling option associated with the connection type of unconnected, the third call handling option being different from the first call handling option and the second call handling option.

In some implementations, the electronic device 120 determines a connection type of indirectly connected when, for example, the caller has at least a threshold connection proximity to the call recipient in the social networking platform, and is not directly connected to the call recipient. For instance, if the threshold proximity is two connections, the connection type for a caller that is directly connected to a user who is directly connected to the call recipient (e.g., the caller is a friend of a friend of the call recipient) is indirectly connected.

The caller can be unconnected to the call recipient when, for example, the caller does not have a minimum threshold connection proximity to the call recipient in the social networking platform (e.g., the caller and call recipient are separated by more than a threshold number of intermediate connections).

In some implementations, the electronic device 120 determines, based on the social network data, that, in the social networking platform, the caller is a friend of the call recipient. The electronic device 120 accesses data that indicates (i) a first call handling option that is designated for calls received from friends of the call recipient in the social networking platform and (ii) at least one other call handling option designated for calls received from callers that are not friends of the call recipient in the social networking platform. In response to determining that, in the social networking platform, the caller is a friend of the call recipient, the electronic device 120 selects, from among at least the first call handling option and the at least one other call handling option, the first call handling option that is designated for calls received from friends of the call recipient in the social networking platform. For instance, the electronic device 120 may select to output an audible alert, such as a ringtone when the caller is a friend, whereas the electronic device 120 would not output an audible alert (e.g., would block the call or forward the call to voicemail) if the caller was not connected to the call recipient in the social networking platform or otherwise was not a friend of the call recipient in the social networking platform.

In some implementations, the electronic device 120 determines, based on the social network data, that the caller is included in a predefined subset of friends of the call recipient in the social networking platform. The electronic device 120 accesses data that indicates (i) a first call handling option that is designated for calls received from friends of the call recipient in the social networking platform that are included in the predefined subset and (ii) at least one other call handling option designated for calls received from friends of the call recipient in the social networking platform that are not included in the predefined subset. In response to determining that the caller is included in the predefined subset of friends of the call recipient in the social networking platform, the electronic device 120 selects, from among at least the first call handling option and the at least one other call handling option, the first call handling option that is designated for calls received from friends of the call recipient in the social networking platform that are included in the predefined subset. For instance, the electronic device 120 may select to output an audible alert, such as a ringtone when the caller is a friend within the subset, whereas the electronic device 120 would not output an audible alert if the caller was a friend that was not included in the subset.

In some implementations, the electronic device 120 determines, based on the social network data, that, in the social networking platform, the caller is a friend of a friend of the call recipient. The electronic device 120 accesses data that indicates (i) a first call handling option that is designated for calls received from friends of friends of the call recipient in the social networking platform and (ii) at least one other call handling option designated for calls received from callers having a relationship to the call recipient in the social networking platform other than being a friend of a friend. In response to determining that, in the social networking platform, the caller is a friend of a friend of the call recipient, the electronic device 120 selects, from among at least the first call handling option and the at least one other call handling option, the first call handling option that is designated for calls received from friends of friends of the call recipient in the social networking platform. For instance, the electronic device 120 may select to output an audible alert, such as a ringtone, when the caller is a friend of a friend, whereas the electronic device 120 would not output an audible alert if the caller was connected to the call recipient only through a more remote social networking connection.

In some implementations, the electronic device 120 determines, based on the social network data, that, in the social networking platform, the caller is designated as a family member of the call recipient. The electronic device 120 accesses data that indicates (i) a first call handling option that is designated for calls received from callers designated as family members of the call recipient in the social networking platform and (ii) at least one other call handling option designated for calls received from callers not designated as family members of the call recipient in the social networking platform. In response to determining that, in the social networking platform, the caller is designated as a family member of the call recipient, the electronic device selects, from among at least the first call handling option and the at least one other call handling option, the first call handling option that is designated for calls received from callers designated as family members of the call recipient in the social networking platform. For instance, the electronic device 120 may select to output an audible alert, such as a ringtone, when the caller is designated as a family member, whereas the electronic device 120 would not output an audible alert if the caller was not designated as a family member.

In some implementations, the electronic device 120 determines, based on the social network data, that the caller is not directly connected to the call recipient in the social networking platform. The electronic device 120 determines, based on the social network data, that the caller and the call recipient are both members of a group defined within the social networking platform (e.g., an alumni group, a social club, or another organization or affiliation). The electronic device 120 accesses data that indicates (i) a first call handling option that is designated for calls received from members of the group defined within the social networking platform and (ii) at least one other call handling option designated for calls received from callers that are not members of the group defined within the social networking platform. In response to determining that the caller and the call recipient are both members of the group defined within the social networking platform, the electronic device 120 selects, from among at least the first call handling option and the at least one other call handling option, the first call handling option that is designated for calls received from members of the group defined within the social networking platform. For example, the electronic device 120 outputs an audible alert for the call because the caller is a member of the group, when the electronic device 120 otherwise would not output an audible alert for a call from a caller that is not directly connected to the call recipient.

In some implementations, the electronic device 120 determines, based on the social network data, that, in the social networking platform, the caller is not connected to the call recipient within a predetermined level of proximity. The electronic device 120 accesses data that indicates (i) a first call handling option that is designated for calls received from callers that are not connected to the call recipient in the social networking platform within the predetermined level of proximity and (ii) at least one other call handling option designated for calls received from callers that are directly connected to the call recipient in the social networking platform. In response to determining that, in the social networking platform, the caller is not connected to the call recipient within the predetermined level of proximity, the electronic device selects, from among at least the first call handling option and the at least one other call handling option, the first call handling option that is designated for calls received from callers that are not connected to call recipient in the social networking platform within the predetermined level of proximity. For instance, the electronic device 120 suppresses an alert for the call because the caller is not connected within the predetermined level of proximity, when the electronic device 120 otherwise would output an alert for a call from a caller that is connected to the call recipient within the predetermined level of proximity.

In some implementations, the electronic device 120 receives, prior to receiving the call, first user input designating a first call handling option for calls received from callers having a first relationship to the call recipient in the social networking platform. To select the call handling option for the call, the electronic device 120 determines, based on the social network data, that, in the social networking platform, the caller has the first relationship to the call recipient. In response to determining that, in the social networking platform, the caller has the first relationship to the call recipient, the electronic device 120 selects the first call handling option.

In some implementations, the electronic device 120 receives, prior to receiving the call, first user input designating a first call handling option for calls received from callers having a first relationship to the call recipient in the social networking platform. The electronic device 120 also receives, prior to receiving the call, second user input designating a second call handling option for calls received from callers having a second relationship to the call recipient in the social networking platform, where the second call handling option is different from the first call handling option, and the second relationship is different from the first relationship. To select the call handling option for the call, the electronic device determines, based on the social network data, that, in the social networking platform, the caller has the first relationship to the call recipient. In response to the determination, the electronic device 120 selects the first call handling option.

In some implementations, the electronic device 120 receives, prior to receiving the call, first user input designating (i) a first call handling option for calls received from callers having a first relationship to the call recipient in the social networking platform and (ii) a range of time during which the first call handling option should be used for calls received from callers having the first relationship to the call recipient in the social networking platform. The electronic device 120 stores, at the electronic device 120 and prior to receiving the call, data identifying the first call handling option and the designated range of time, for example, as a user-defined call handling rule. To select the call handling option for the call, the electronic device 120 accesses, after receiving the call, the data stored at the electronic device 120 that identifies the first call handling option and the designated range of time. The electronic device 120 determines, based on the social network data, that, in the social networking platform, the caller has the first relationship to the call recipient. The electronic device 120 identifies a time of the call (e.g., a time when the call was received), and determines that the identified time of the call is within the designated range of time. In response to determining that, in the social networking platform, the caller has the first relationship to the call recipient and that the identified time of the call is within the designated range of time, selecting the first call handling option.

In an example, the electronic device 120 receives a second call from a second caller. The electronic device 120 obtains a second identifier associated with a second calling device from which the second call originated. The electronic device 120 uses the second identifier to access second social network data that is descriptive of a relationship of the second caller to the call recipient in the social networking platform. Based on the second social network data, the electronic device 120 determines that the second caller has the first relationship to the call recipient. The electronic device 120 identifies a time of the second call, and determines that the time of the second call is not within the designated range of time. In response to determining that the time of the second call is not within the designated range of time, the electronic device selects a second call handling option that is different from the first call handling option and uses the second call handling option to perform a call handling action for the second call.

In some implementations, the electronic device 120 selects the call handling option for the call based on a location associated with the caller. For instance, the electronic device 120 may identify, based on the social network data, a first location associated with the caller. The first location may be a location of the caller at a time of the call, or an estimate of the location of the caller at the time of the call (e.g., a recent or last-known location of the caller, a likely location of the caller, an approximate location of the caller, etc.). The electronic device identifies a second location associated with the call recipient. The second location may be a location of the call recipient at the time of the call, or an estimate of the location of the recipient at the time of the call. The electronic device 120 determines a distance between the first location and the second location. The electronic device 120 accesses a threshold distance and compares the distance between the first location and the second location to the threshold distance. Based on comparison results, the electronic device 120 determines that the distance between the first location and the second location are within the threshold distance. The electronic device 120 selects the call handling option for the call based on determining that the first location and the second location are within the threshold distance.

In some implementations, to select the call handling option for the call based on determining that the first location and the second location are within the threshold distance, the electronic device 120 determines, based on the social network data, a relationship of the caller to the call recipient. The electronic device 120 identifies a first call handling option designated for calls received from callers having the determined relationship to the call recipient. The electronic device 120 modifies the first call handling option in response to determining that the first location and the second location are within the threshold distance. The electronic device 120 selects the modified call handling option as the call handling option for the call.

A call may be of more interest to the recipient when the caller is located nearby. Thus, in some implementations, a selected call handling option may modified to provide greater notification to the recipient when the caller is determined to be located within the predetermined distance. For example, a call that would otherwise have been blocked or sent directly to voicemail may be allowed to ring or otherwise reach the call recipient.

In some implementations, the use of location information to select the call handling option for the call is conditioned on the relationship of the caller to the call recipient in the social networking platform. For instance, the electronic device 120 selects the call handling option based on a location of the caller in response to determining, based on the social network, that, in the social networking platform, the caller has a particular relationship with the call recipient, or that the caller has one of a predefined set of relationships with the call recipient. However, if the caller does not have the particular relationship (or a relationship of the predefined set of relationships), then location information is not used to select a call handling option.

As an example, in some implementations, the electronic device 120 determines, based on the social network data, that, in the social networking platform, the caller is a friend of the call recipient. In response to determining that the caller is a friend of the call recipient in the social networking platform, the electronic device 120 selects the call handling option based on the location of the caller. The electronic device 120 may receive a second call from a second caller, and determine that the second caller is not a friend of the call recipient. In response to determining that the second caller is not a friend of the call recipient, the electronic device 120 selects the call handling option for the second call without using a location of the second caller.

In some implementations, the electronic device 120 accesses social network data that enables determination of one or more events experienced by the caller. The electronic device 120 may select the call handling option based on one or more events experienced by the caller. For instance the electronic device 120 determines, based on the social network data, a relationship of the caller to the call recipient. The electronic device 120 also determines, based on the social network data, that the caller has experienced an event. The electronic device 120 identifies a first call handling option designated for calls received from callers that have experienced the event. The call handling option is different from a second call handling option that is designated for calls received from callers having the determined relationship to the call recipient that have not experienced the event. The electronic device 120 selects the first call handling option as the call handling option for the call.

In some implementations, the electronic device 120 selects call handling options based on events that the caller has experienced only when the caller has a particular relationship to the call recipient (e.g., when the caller is a friend, or when the caller is directly connected to the call recipient in the social networking platform). In some implementations, the electronic device 120 selects call handling options based on events that the caller has experienced only when the events have occurred within a predetermined window of time (e.g., within five days of the call, or within a month of the call).

The electronic device 120 uses the selected call handling option to perform a call handling action for the call (410). The call handling action includes one or more operations performed by the electronic device 120 to handle the call. For instance, in accordance with the selected call handling option, the electronic device 120 may provide an alert for the call and permit the call to be answered; without disconnecting the call, suppress an alert for the call; block or disconnect the call; forward the call to another device; forward the call to voicemail; provide a missed call alert after the call terminates; suppress a missed call alert for the call; add the call to a call list; exclude the call from a call list; send a message to the calling device; send, to the calling device, data regarding a calendar associated with the call recipient; or send a message to a third device that is different from the electronic device and the calling device.

Figure 5:
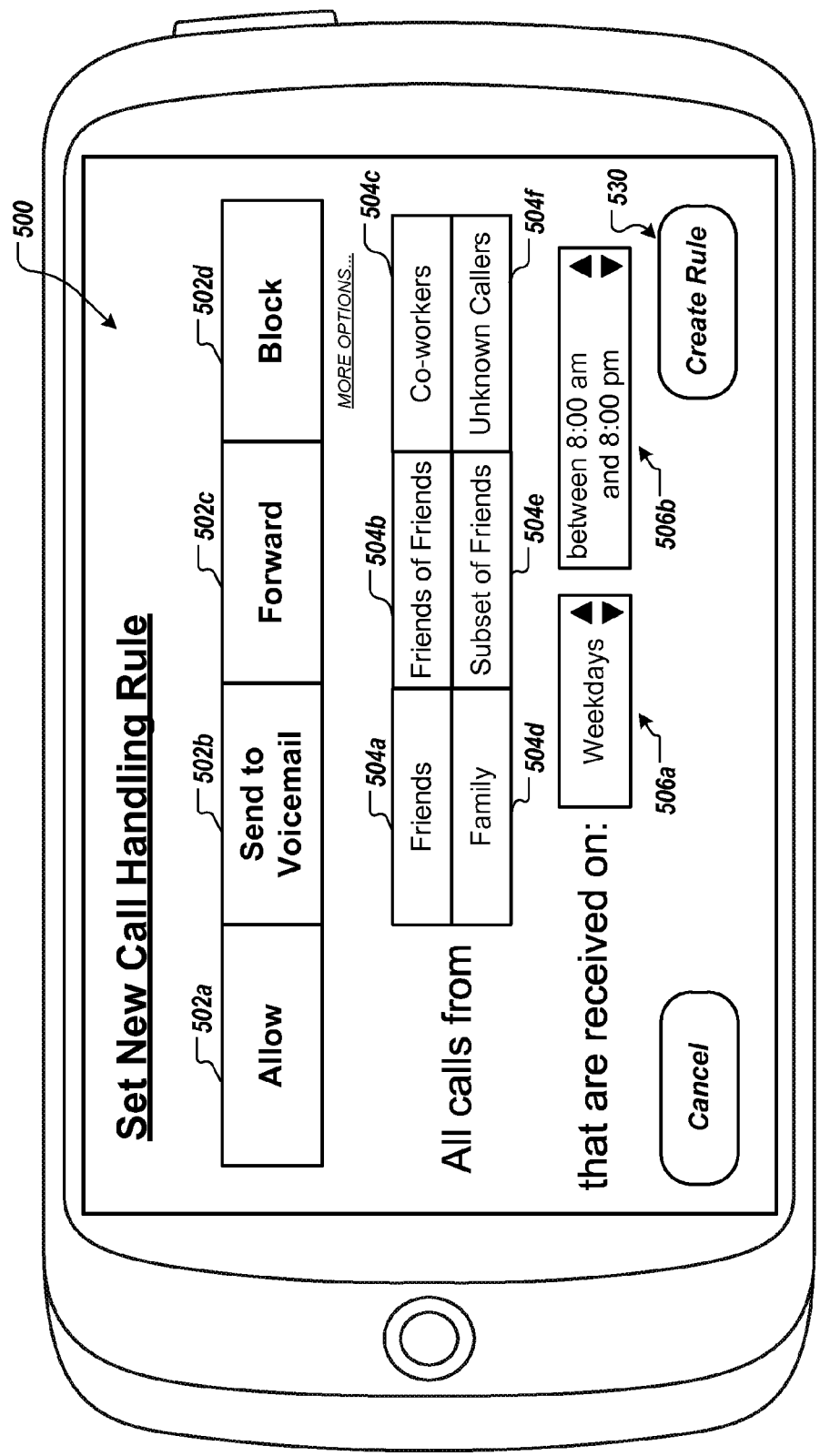
FIG. 5 is a diagram illustrating an example of a user interface for setting call handling rules.

FIG. 5 illustrates an example of a user interface 500 for setting call handling rules. The user interface 500 permits the user of an electronic device to associate call handling options with different groups of users defined in one or more social networking platforms. In some implementations, the groups of users are defined by relationship types within the social networking platform, such that friends of the recipient form one group, friends of friends of the recipient form another group, and so on. As described above, when the electronic device receives a call from a caller, the electronic device produces the alert that was previously associated with the group of users in the social networking platform to which the caller belongs.

In some implementations, the user interface 500 is a rendered web page or an interface of an application running on the electronic device. Call handling rules defined using the user interface 500 can be used to select call handling options for calls received by the electronic device that provides the user interface 500 and/or other electronic devices. For example, a user may set call handling rules using one electronic device, and the call handling rules may be transmitted to one or more different electronic devices.

The user interface 500 includes elements 502a-502d that identify different call handling actions, to allow a call 502a, send a call to voicemail 502b, to forward a call 502c, or block a call 502d, respectively. By interacting with the elements 502a-502d, a user can select a call handling action that, as described below, will be performed for future calls that satisfy criteria specified by the user. In some implementations, a user may select multiple call handling actions to perform for a single call.

The user interface 500 includes elements 504a-504f that identify sets of users defined within the social networking platform. The different sets of users can be defined by different relationship types in the social networking platform, or by classifications based on connections within the social networking platform. For example, in FIG. 5, each of the elements 504a-504f identifies a different set of users, respectively, friends 504a, friends of friends 504b, co-workers 504c, family members 504d, friends in a subset of the user's friends 504e, and unknown users 504f. By interacting with one or more of the elements 504a-504f, the user can select a set of users. The selected set of users can include combinations of the sets of users shown, such as a group including friends and family.

The user interface 500 includes controls 506a, 506b that enable the user to select a range of times during which the call handling rule is applicable. The control 506a permits the user to select days of the week (e.g., Monday, Tuesday, Wednesday, etc., or weekend days, or weekdays), and the control 506b permits the user to select a range of time within the selected day(s). The user interface 500 may include controls to set any appropriate range of time.

After a user selects a call handling action, a set of callers for which the alert applies, and a range of time, the user can interact with a button 530 or other control to create a new call handling rule. After setting the rule, the electronic device will perform the specified call handling action(s) each time a call meeting the criteria of the rule is received, that is, when the call is from a caller having the specified relationship to the user and the call is received during the specified range of time.

In some implementations, the user interface 500 permits the user to set rules that designate responses to communication events other than receipt of an incoming call, for example, a call being missed, or receipt of a text message. Similar techniques described throughout this disclosure for handling calls may be applied to other types of communications.

FIG. 6 illustrates a table 600 with example call handling rules 601a-601i. The table 600 identifies relationships 602a-602i (e.g., relationship classifications) defined in one or more social networks, and call handling actions 608a-608i associated with those relationships 602a-602i. The call handling rules 601a-601i also indicate periods of time, indicated by days 604a-604i and times of day 606a-606i, during which the call handling actions 608a-608i are performed. When an electronic device receives a call from a caller having one of the specified relationships 602a-602i to the recipient, and the call is received during a designated time period, the electronic device performs the associated call handling action. The table 600, or a data structure that includes the data in the table, may be stored on the electronic device 120.

In the illustrated example, sets of users defined by relationships 602a-602i include friends 602a, friends of friends 602b, family 602c, a subset of the friends 602d (e.g., a set of friends who are also designated as poker players), unknown callers 602e (e.g., users that are more distant than a friend of a friend), and co-workers 602g.

In addition, the relationships 602a-602i include users having a particular relationship in a particular social network (e.g., Facebook friends 602i). In some implementations, a particular relationship status, such as friend status, can be associated with a different call handling action for callers connected to the recipient in different social networking platforms. For example, a first call handling action may be performed for calls from friends in a first social networking platform, and a second, different call handling action may be provided for calls from friends in a second, different social networking platform (e.g., a social networking platform operated independently from the first social networking platform).

In some social networking platforms, groups are defined such that users may be included in (or affiliated with) the group without being directly connected to each other. The alumni group 602f and the professional organization 602h are examples of relationships that reflect membership in such groups. Other relationships, and thus other sets of potential callers, also may be defined.

Although the examples of call handling rules 601a-601i shown in the table 600 specify positive criteria for times and relationships, these criteria can also be defined by exclusion. For example, an electronic device can use a call handling rule that designates call handling actions for calls from all callers except for those having particular social networking characteristics, and for calls received at any time except during an excluded period of time.

Figure 7:
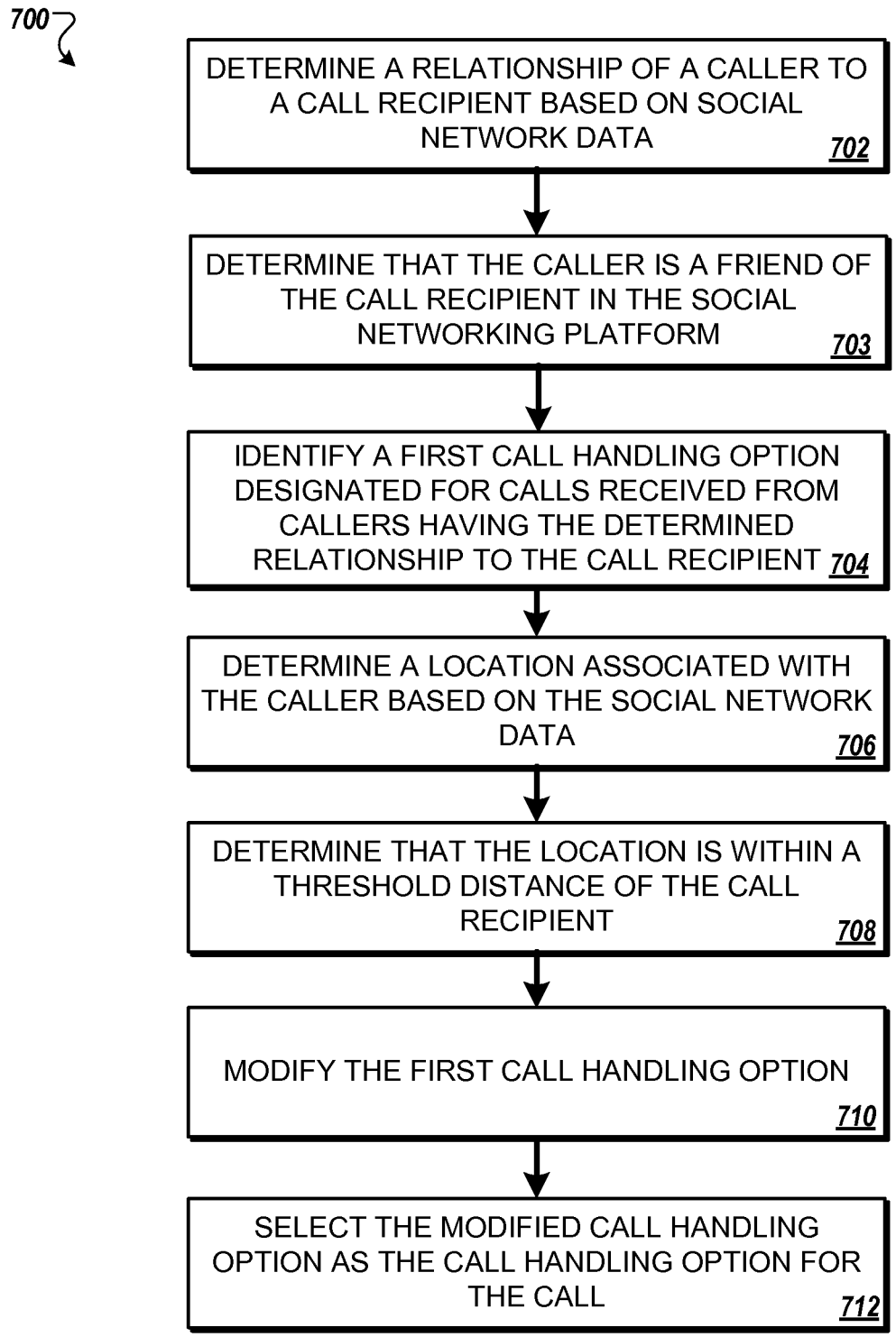
FIG. 7 is a flow diagram illustrating an example of a process for handling calls using location information.

FIG. 7 illustrates an example of a process 700 for selecting a call handling option using location information. As described below, the process 700 can be performed by an electronic device, for example, the electronic device 120 of FIGS. 1A-1C. The process 700 can be used to perform the selection (408) in the process 400.

The electronic device 120 determines a relationship of a caller to a call recipient based on social network data (702). As described above, the electronic device 120 may store, before the call is received, social network data that is descriptive of the relationship, or the electronic device 120 may obtain social network data that is descriptive of the relationship over a network in response to the call or another communication event.

The electronic device 120 determines that the caller is a friend of the call recipient in the social networking platform (703). In some implementations, the use of location information is conditioned on the relationship of the caller to the recipient in the social networking platform. For example, in some implementations, the electronic device 120 selects call handling options based on the location of a caller only when the caller is determined to have a particular relationship to the recipient within a social networking platform, such as when the caller is a friend of the recipient within a social networking platform. In this example, when the caller is determined to be a friend within a social networking platform, the electronic device 120 performs the remaining operations of the process 700, but the electronic device 120 performs different operations if the caller is not determined to be a friend of the recipient.

The electronic device 120 identifies a first call handling option designated for calls received from callers having the determined relationship to the call recipient (704). For example, the electronic device 120 can identify the call handling option corresponding to the determined relationship using one of the call handling options illustrated in FIG. 1A-1C, 6, or 9.

The electronic device 120 identifies a location associated with the caller based on the social network data (706). For example, the electronic device 120 identifies a "check-in" location, such as the most recent check-in location for the caller that indicates a place that the caller has visited. The electronic device 120 may identify the location using other types of social network data that associates the caller with a location, such as a social networking profile for the caller, status indications for the caller, tags or labels for photographs shared in the social networking platform, or posts or other submissions from any user, to name a few examples. The identified location can be a current location of the caller or a recent location of the caller (e.g., a location of the caller at a time within a threshold time period). In some implementations, the location is obtained by the recipient after the caller has permitted the location to be shared (e.g., by making the location public in a public post or check-in, or by opting in to authorize sharing of location information).

The electronic device 120 determines that the location associated with the caller is within a threshold distance of the call recipient (708). The electronic device 120 determines a location associated with the call recipient (e.g., a current location of the electronic device 120). For example, the electronic device 120 determines a location associated with the recipient using a Global Positioning System (GPS) receiver module, triangulation, information received from nearby devices, recent user input from the recipient, or social network data about the recipient (e.g., the call recipient's social networking profile, posts, status indications, etc.). The electronic device 120 can then calculate a distance between the location associated with the caller and the location associated with the call recipient, and compare the distance to a threshold distance (e.g., a threshold distance of 5 miles, 25 miles, 100 miles, etc.).

In response to determining that the location associated with the caller is within a threshold distance of the location associated with the call recipient, the electronic device 120 modifies the first call handling option (710). As an example, the electronic device 120 adds an additional action to the first call handling option, such as providing a call notification to an additional device, where the first call handling option did not designate the notification. As another example, the electronic device 120 overrides the first call handling action by adding the output of a ringtone and a time period for the recipient to answer, although the first call handling option designates that the call should be sent straight to voicemail. As another example, the electronic device 120 replaces the first call handling option with one or more actions designated for calls received from nearby callers.

The electronic device 120 selects the modified call handling option as the call handling option for the call (712). For instance, rather than performing a call handling action defined by the first call handling option, the electronic device 120 selects the modified call handling option and performs a call handling action defined by the modified call handling option. By contrast, in instances when the caller is not determined to be within the threshold distance of the call recipient, the electronic device 120 selects the first call handling option, which corresponds to the caller's relationship to the call recipient, as the call handling option for the call.

In some implementations, location information is used to select a call handling option, rather than modify an already selected call handling option. Further, while examples are provided showing call handling options that are selected based on both a relationship of the caller and geographic proximity of the caller, the techniques described above can be used to select call handling options based on geographic proximity only. For example, a particular call handling option can be selected for calls from any caller determined to be within a predetermined distance of the call recipient, regardless of the relationship of the caller to the call recipient in the social networking platform.

Figure 8:
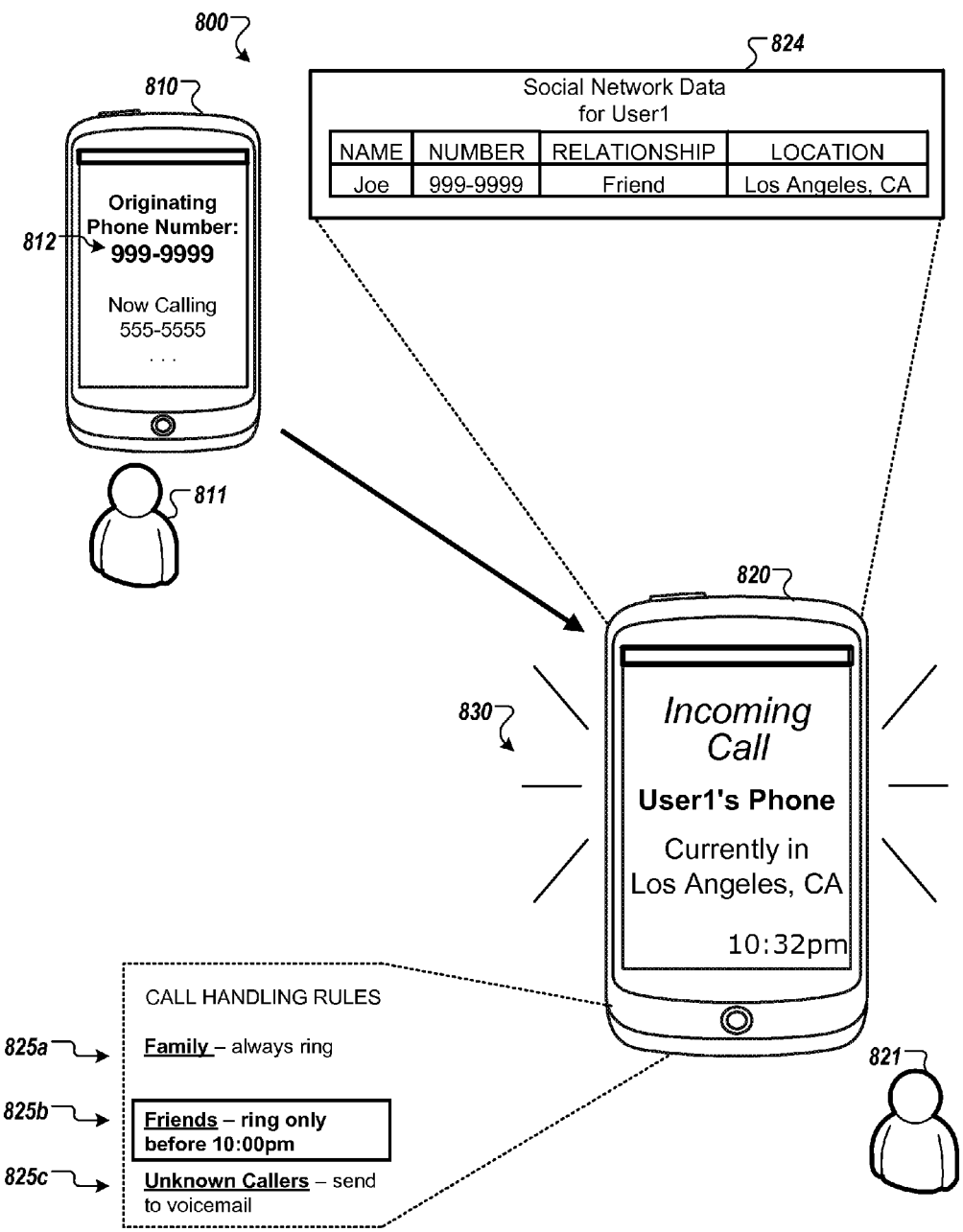
FIG. 8 is a diagram illustrating an example of handling a call using location information.

FIG. 8 illustrates an example of a system 800 that handles calls using location information. In the illustrated example, a call is initiated at an electronic device 810 associated with a caller 811. An electronic device 820 associated with a recipient 821 receives the call. The electronic device 820 compares the phone number 812 of the caller's electronic device 810 with social network data 824, and determines that the caller 811 is a friend of the recipient 821 in the social networking platform. From among several different call handling options, defined by call handling rules 825a-825c, the electronic device 820 selects a call handling option designated for calls from friends of the recipient 821 in the social networking platform. In the example, the selected call handling option designates that, when the caller is a friend, the electronic device 810 should not ring after 10:00 pm. Using this call handling option, the electronic device 820 would not provide an alert for the call, because the call is received after 10:00 pm.

In the illustrated example, the electronic device 820 modifies the call handling option based on geographic proximity of the caller 811 to the recipient 821. In the example of FIG. 8, the electronic device 820 modifies call handling options only when the caller is a friend. Because the caller 811 is a friend or family member of the recipient 821, the electronic device 820 determines whether the location of the caller 811 is such that the call handling option for the call should be modified to account for geographic proximity of the caller 811.

The electronic device 820 obtains a location associated with the caller 811 using social network data 824. The electronic device 820 determines, based on the social network data 824, that the caller 811 is in Los Angeles, Calif. The electronic device 820 also determines that the recipient 821 is in Los Angeles, Calif. or is otherwise within a threshold distance of the caller 811. In response, the electronic device 820 modifies the selected call handling option to include output of a ringtone as a notification, where the electronic device 820 otherwise would not have output an alert. According to the modified call handling option, the electronic device 820 outputs the ringtone 830. As a result, the recipient 821 is informed of the call from the nearby caller 811, where the recipient would not have been informed of the call if the caller 811 had not been located within the predetermined distance.

Figure 9:
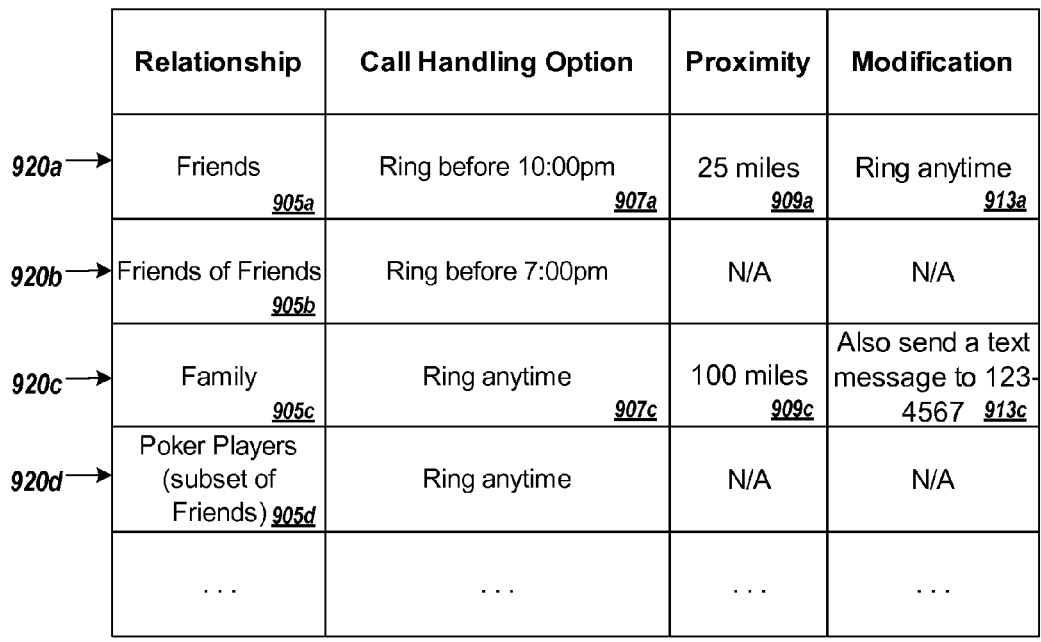

FIG. 9 illustrates a table 900 with example call handling rules 920a-920d. In the example, some call handling rules 920a, 920c designate modifications to their associated call handling options that may be made based on the location of a caller, for example, when a caller having the specified relationship is at a location within a threshold distance. As described above, an electronic device can determine the location of the caller based on social network data. The call handling rules 920a-920d are each associated with a different relationship 905a-905d. The relationships 905a-905d specify sets of users defined by social networking connections, namely, friends 905a, friends of friends 905b, family 905c, and poker players 905d, which is a subset of the friends in the social networking platform The call handling rules 920a, 920c each specify an associated distance threshold 909a, 909c, which permits the distance threshold for each call handling rule to be different. The call handling rules 920a, 920c also specify a modification 913a, 913c to the respective call handling options 907a, 907c that occur when the distance threshold is satisfied. For instance, the modification 913a designates that an electronic device provides an audible alert any time that a call is received from a friend located within 25 miles of the call recipient. This modifies the typical call handling option 907a for calls from friends, which limits the times that alerts are provided. The modification 913c designates that, when an electronic device receives a call from a caller who is designated as a family member in a social network, and the caller is located within 100 miles of the call recipient, the electronic device sends a text message to a designated number. The text message is sent in addition to providing an audible alert, which is the typical call handling option 907c for calls from family members.

The other call handling rules 920b, 920d do not specify that any modification should occur based on distance. Accordingly, these call handling rules indicate that the same call handling option should be selected regardless of geographic proximity of the caller and the recipient.

Referring to FIGS. 6-9, in some implementations, call handling options are selected or modified based on other social network data, in addition to or instead of data indicative of the social networking relationship of the caller and the recipient and the geographic proximity of the caller to the recipient. Just as a call handling option may be selected based on geographic proximity, a call handling option may additionally or alternatively be indicative of, for example, an event in the caller's life, a status change in a caller's social networking profile, or other information derived from social network data.

In some implementations, a server system provides information about significant events or attributes of the caller that are reflected in the social networking platform. In these implementations, a server system can analyze social network content to identify a significant event or change in status associated with the caller. For example, the server system may infer, based on a caller's activity within a social networking platform (e.g., message posts within the social networking platform, by the caller and/or other users), that various events have occurred, such as: (1) positive romantic relationship developments (e.g., new boyfriend or girlfriend, engagement, marriage, etc.); (2) negative romantic relationship developments (e.g., breakup, divorce, etc.); (3) birth of new child; (4) acquisition of a new pet; (5) illness; (6); upcoming or recent trip or vacation; (7) starting a new job; (8) moving to a new city; (9) obtaining a new home; and (10) obtaining a new vehicle.

An electronic device can use information that the server system infers about events associated with the caller (e.g., changes in status, or other events) to select or modify a call handling option for a call from the caller. For example, when call handling rules dictate that a call be sent directly to voicemail, an electronic device can instead provide an audible alert and opportunity to answer when information from the server system indicates that the caller has experienced one of a predetermined set of events. As an example, at a time when an electronic device would send calls to voicemail, the electronic device can provide an alert for a call from a friend that has had a romantic relationship development, or experienced another significant event, within a threshold period of time of the call. In a similar manner, call handling options (or modifications of call handling options) can be associated with any of the events described above or other events inferred from social network data.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. At least one non-transitory computer-readable storage medium encoded with executable instructions that, when executed by at least one processor, cause the at least one processor to perform operations comprising:

receiving, at an electronic device and from a caller, a call, the electronic device being associated with a call recipient;

obtaining an identifier associated with a calling device from which the call originated;

using the identifier to access social network data that is descriptive of a relationship of the caller to the call recipient in a social networking platform;

selecting, from among multiple, different call handling options, a call handling option for the call based on the social network data that is descriptive of the relationship of the caller to the call recipient in the social networking platform, wherein selecting the call handling option comprises:

determining, based on the social network data, a connection type of the caller to the call recipient in the social networking platform, the connection type being selected from a set of connection types including at least connection types of directly connected, indirectly connected, and unconnected; and in response to determining the connection type of the caller to the call recipient in the social networking platform, selecting, as the call handling option for the call, a call handling option associated with the determined connection type, the selected call handling option being selected from among at least:

a first call handling option associated with the connection type of directly connected;

a second call handling option associated with the connection type of indirectly connected, the second call handling option being different from the first call handling option; and a third call handling option associated with the connection type of unconnected, the third call handling option being different from the first call handling option and the second call handling option; and using the selected call handling option to perform a call handling action for the call.

2. The at least one non-transitory computer-readable storage medium of claim 1, wherein receiving, at the electronic device and from the caller, the call, the electronic device being associated with the call recipient, comprises receiving, at a phone associated with the call recipient, an incoming phone call; and wherein obtaining the identifier associated with the calling device from which the call originated comprises identifying a phone number associated with a phone from which the call originated.

3. The at least one non-transitory computer-readable storage medium of claim 1, wherein selecting, from among the multiple, different call handling options, the call handling option for the call based on the social network data that is descriptive of the relationship of the caller to the call recipient in the social networking platform comprises selecting the call handling option from among a set of call handling options designating different call handling actions, the different call handling actions comprising two or more of:

providing an alert for the call and permitting the call to be answered;

without disconnecting the call, suppressing an alert for the call;

blocking or disconnecting the call;

forwarding the call to another device;

forwarding the call to voicemail;

providing a missed call alert after the call terminates;

suppressing a missed call alert for the call;

adding the call to a call list;

excluding the call from a call list;

sending a message to the calling device;

sending, to the calling device, data regarding a calendar associated with the call recipient; and sending a message to a third device that is different from the electronic device and the calling device.

4. The at least one non-transitory computer-readable storage medium of claim 1, wherein selecting, from among the multiple, different call handling options, the call handling option for the call based on the social network data that is descriptive of the relationship of the caller to the call recipient in the social networking platform comprises:

determining, based on the social network data, a relationship of the caller to the call recipient in the social networking platform;

accessing call handling data that associates each of the multiple, different call handling options with a different relationship to the call recipient in the social networking platform;

comparing the determined relationship to the call recipient with the accessed call handling data; and based on comparison results, selecting a call handling option designated for calls received from callers having the determined relationship to the call recipient.

5. The at least one non-transitory computer-readable storage medium of claim 1, wherein selecting the call handling option for the call based on the social network data that is descriptive of the relationship of the caller to the call recipient in the social networking platform comprises:

determining, based on the social network data, that, in the social networking platform, the caller is a friend of the call recipient; and in response to determining that, in the social networking platform, the caller is a friend of the call recipient, selecting, from among at least a call handling option that is designated for calls received from friends of the call recipient in the social networking platform and at least one other call handling option designated for calls received from callers that are not friends of the call recipient in the social networking platform, the call handling option that is designated for calls received from friends of the call recipient in the social networking platform.

6. The at least one non-transitory computer-readable storage medium of claim 1, wherein selecting the call handling option for the call based on the social network data that is descriptive of the relationship of the caller to the call recipient in the social networking platform comprises:

determining, based on the social network data, that the caller is included in a predefined subset of friends of the call recipient in the social networking platform; and in response to determining that the caller is included in the predefined subset of friends of the call recipient in the social networking platform, selecting, from among at least a call handling option that is designated for calls received from friends of the call recipient in the social networking platform that are included in the predefined subset and at least one other call handling option designated for calls received from friends of the call recipient in the social networking platform that are not included in the predefined subset, the call handling option that is designated for calls received from friends of the call recipient in the social networking platform that are included in the predefined subset.

7. The at least one non-transitory computer-readable storage medium of claim 1, wherein selecting the call handling option for the call based on the social network data that is descriptive of the relationship of the caller to the call recipient in the social networking platform comprises:

determining, based on the social network data, that, in the social networking platform, the caller is a friend of a friend of the call recipient; and in response to determining that, in the social networking platform, the caller is a friend of a friend of the call recipient, selecting, from among at least a call handling option that is designated for calls received from friends of friends of the call recipient in the social networking platform and at least one other call handling option designated for calls received from callers having a relationship to the call recipient in the social networking platform other than being a friend of a friend, the call handling option that is designated for calls received from friends of friends of the call recipient in the social networking platform.

8. The at least one non-transitory computer-readable storage medium of claim 1, wherein selecting the call handling option for the call based on the social network data that is descriptive of the relationship of the caller to the call recipient in the social networking platform comprises:

determining, based on the social network data, that, in the social networking platform, the caller is designated as a family member of the call recipient; and in response to determining that, in the social networking platform, the caller is designated as a family member of the call recipient, selecting, from among at least a call handling option that is designated for calls received from callers designated as family members of the call recipient in the social networking platform and at least one other call handling option designated for calls received from callers not designated as family members of the call recipient in the social networking platform, the call handling option that is designated for calls received from callers designated as family members of the call recipient in the social networking platform.

9. The at least one non-transitory computer-readable storage medium of claim 1, wherein selecting the call handling option for the call based on the social network data that is descriptive of the relationship of the caller to the call recipient in the social networking platform comprises:

determining, based on the social network data, that the caller is not directly connected to the call recipient in the social networking platform;

determining, based on the social network data, that the caller and the call recipient are both members of a group defined within the social networking platform; and in response to determining that the caller and the call recipient are both members of a group defined within the social networking platform, selecting, from among at least a call handling option that is designated for calls received from members of the group defined within the social networking platform and at least one other call handling option designated for calls received from callers that are not members of the group defined within the social networking platform, the call handling option that is designated for calls received from members of the group defined within the social networking platform.

10. The at least one non-transitory computer-readable storage medium of claim 1, wherein selecting the call handling option for the call based on the social network data that is descriptive of the relationship of the caller to the call recipient in the social networking platform comprises:

determining, based on the social network data, that, in the social networking platform, the caller is not connected to the call recipient within a predetermined level of proximity; and in response to determining, based on the social network data, that, in the social networking platform, the caller is not connected to the call recipient within a predetermined level of proximity, selecting, from among at least a call handling option that is designated for calls received from callers that are not connected to the call recipient within a predetermined level of proximity and at least one other call handling option designated for calls received from callers that have a relationship to the call recipient in the social networking platform, the call handling option that is designated for calls received from callers that are not connected to the call recipient within a predetermined level of proximity.

11. The at least one non-transitory computer-readable storage medium of claim 1:

wherein the operations further comprise receiving, prior to receiving the call, first user input designating a call handling option for calls received from callers having a first relationship to the call recipient in the social networking platform; and wherein selecting, from among the multiple, different call handling options, the call handling option for the call based on the social network data that is descriptive of the relationship of the caller to the call recipient in the social networking platform comprises:

determining, based on the social network data, that, in the social networking platform, the caller has the first relationship to the call recipient; and in response to determining that, in the social networking platform, the caller has the first relationship to the call recipient, selecting the call handling option for calls received from callers having the first relationship to the call recipient in the social networking platform.

12. The at least one non-transitory computer-readable storage medium of claim 1:

wherein the operations further comprise receiving, prior to receiving the call, first user input designating (i) a particular call handling option for calls received from callers having a first relationship to the call recipient in the social networking platform and (ii) a range of time during which the particular call handling option should be used for calls received from callers having the first relationship to the call recipient in the social networking platform; and wherein selecting, from among the multiple, different call handling options, the call handling option for the call based on the social network data that is descriptive of the relationship of the caller to the call recipient in the social networking platform comprises:

determining, based on the social network data, that, in the social networking platform, the caller has the first relationship to the call recipient;

identifying a time of the call;

determining that the identified time of the call is within the designated range of time; and in response to determining that, in the social networking platform, the caller has the first relationship to the call recipient and that the identified time of the call is within the designated range of time, selecting the particular call handling option.

13. The at least one non-transitory computer-readable storage medium of claim 1, wherein using the identifier to access social network data that is descriptive of the relationship of the caller to the call recipient in the social networking platform comprises accessing, from a storage unit of the electronic device, social network data received, prior to receiving the call, from a social networking service that operates the social network, the social network data being descriptive of the relationship of the caller to the call recipient.

14. The at least one non-transitory computer-readable storage medium of claim 1, wherein using the phone number to access social network data that is descriptive of the relationship of the caller to the call recipient in the social networking platform comprises:
  after receiving the call and before using the selected call handling option to perform the call handling action for the call:
    providing the identifier to a social networking service that operates the social network; and
    receiving, over a network and from the social networking service that operates the social network, the social network data.

15. The at least one non-transitory computer-readable storage medium of claim 1, wherein selecting, from among the multiple, different call handling options, the call handling option for the call based on the social network data that is descriptive of the relationship of the caller to the call recipient in the social networking platform comprises:
  identifying, based on the social network data, a first location associated with the caller at a time of the call;
  identifying a second location associated with the call recipient, the second location being a location of the call recipient at the time of the call;
  determining a distance between the first location and the second location;
  accessing a threshold distance;
  comparing the distance between the first location and the second location to the threshold distance;
  based on comparison results, determining that the distance between the first location and the second location are within the threshold distance; and
  selecting the call handling option for the call based on determining that the first location and the second location are within the threshold distance.

16. The at least one non-transitory computer-readable storage medium of claim 1, wherein using the identifier to access social network data that is descriptive of a relationship of the caller to the call recipient in the social networking platform comprises receiving social network data that enables determination of one or more events experienced by the caller;
  wherein selecting, from among the multiple, different call handling options, the call handling option for the call based on the social network data that is descriptive of the relationship of the caller to the call recipient in the social networking platform comprises:
    determining, based on the social network data, a relationship of the caller to the call recipient;
    determining, based on the social network data, that the caller has experienced an event;
    identifying a particular call handling option designated for calls received from callers that have experienced the event, the call handling option being different from a second call handling option designated for calls received from callers having the determined relationship to the call recipient that have not experienced the event; and
    selecting the particular call handling option as the call handling option for the call.

17. A method performed by one or more processing devices, the method comprising:
  receiving, at an electronic device and from a caller, a call, the electronic device being associated with a call recipient;
  obtaining an identifier associated with a calling device from which the call originated;
  using the identifier to access social network data that is descriptive of a relationship of the caller to the call recipient in a social network;
  selecting, from among multiple, different call handling options, a call handling option for the call based on the social network data that is descriptive of the relationship of the caller to the call recipient in the social networking platform, wherein selecting the call handling option for the call comprises:
    determining, based on the social network data, a connection type of the caller to the call recipient in the social networking platform, the connection type being selected from a set of connection types including at least connection types of directly connected, indirectly connected, and unconnected; and
    in response to determining the connection type of the caller to the call recipient in the social networking platform, selecting, as the call handling option for the call, a call handling option associated with the determined connection type, the selected call handling option being selected from among at least:
      a first call handling option associated with the connection type of directly connected;
      a second call handling option associated with the connection type of indirectly connected, the second call handling option being different from the first call handling option; and
      a third call handling option associated with the connection type of unconnected, the third call handling option being different from the first call handling option and the second call handling option; and
  using the selected call handling option to perform a call handling action for the call.

18. At least one non-transitory computer-readable storage medium encoded with executable instructions that, when executed by at least one processor, cause the at least one processor to perform operations comprising:
  receiving, at an electronic device and from a caller, a call, the electronic device being associated with a call recipient;
  obtaining an identifier associated with a calling device from which the call originated;
  using the identifier to access social network data that is descriptive of a relationship of the caller to the call recipient in a social networking platform, wherein using the identifier to access the social network data comprises receiving social network data that enables determination of one or more events experienced by the caller;
  selecting, from among multiple, different call handling options, a call handling option for the call based on the social network data that is descriptive of the relationship of the caller to the call recipient in the social networking platform, wherein selecting the call handling option for the call comprises:
    determining, based on the social network data, a relationship of the caller to the call recipient;
    determining, based on the social network data, that the caller has experienced an event;
    identifying a first call handling option designated for calls received from callers that have experienced the event, the call handling option being different from a second call handling option designated for calls received from callers having the determined relationship to the call recipient that have not experienced the event; and selecting the first call handling option as the call handling option for the call; and using the selected call handling option to perform a call handling action for the call.

19. A method performed by one or more processing devices, the method comprising:

receiving, at an electronic device and from a caller, a call, the electronic device being associated with a call recipient;

obtaining an identifier associated with a calling device from which the call originated;

using the identifier to access social network data that is descriptive of a relationship of the caller to the call recipient in a social networking platform, wherein using the identifier to access the social network data comprises receiving social network data that enables determination of one or more events experienced by the caller;

selecting, from among multiple, different call handling options, a call handling option for the call based on the social network data that is descriptive of the relationship of the caller to the call recipient in the social networking platform, wherein selecting the call handling option for the call comprises:

determining, based on the social network data, a relationship of the caller to the call recipient;

determining, based on the social network data, that the caller has experienced an event;

identifying a first call handling option designated for calls received from callers that have experienced the event, the call handling option being different from a second call handling option designated for calls received from callers having the determined relationship to the call recipient that have not experienced the event; and selecting the first call handling option as the call handling option for the call; and using the selected call handling option to perform a call handling action for the call.

\* \* \* \* \*